(12) United States Patent
Norisada et al.

(10) Patent No.: US 9,866,129 B2
(45) Date of Patent: Jan. 9, 2018

(54) POWER CONVERSION DEVICE INCLUDING PRIMARY INVERTER, TRANSFORMER, SECONDARY CONVERTER, AND CONTROLLER

(71) Applicant: Panasonic Intellectual Property Management Co., Ltd., Osaka (JP)

(72) Inventors: Takaaki Norisada, Osaka (JP); Fumito Kusama, Osaka (JP); Go Yamada, Osaka (JP); Keiji Akamatsu, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/458,129

(22) Filed: Mar. 14, 2017

(65) Prior Publication Data
US 2017/0294843 A1 Oct. 12, 2017

(30) Foreign Application Priority Data
Apr. 8, 2016 (JP) .................................. 2016-077973

(51) Int. Cl.
*H02M 3/335* (2006.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 2001/0048* (2013.01)

(58) Field of Classification Search
None
See application file for complete search history.

(56) References Cited

U.S. PATENT DOCUMENTS

| 5,159,539 A * | 10/1992 | Koyama | ............. | H02M 7/4807 363/10 |
|---|---|---|---|---|
| 2004/0066094 A1 | 4/2004 | Suzuki et al. | | |
| 2008/0055954 A1 | 3/2008 | Kajouke et al. | | |

(Continued)

FOREIGN PATENT DOCUMENTS

| JP | 3-007073 | 1/1991 |
|---|---|---|
| JP | 2004-135408 | 4/2004 |

(Continued)

*Primary Examiner* — Jeffrey Gblende
(74) *Attorney, Agent, or Firm* — McDermott Will & Emery LLP

(57) ABSTRACT

A power converter includes first to fourth terminals, a transformer including primary and secondary windings, an inverter connected between the first and second terminals and the primary winding, a converter connected between fifth and sixth terminals, and a controller. The converter includes first to eighth switch circuits each including a diode and a switch connected in parallel. When a voltage between the fifth and sixth terminals has first polarity, the controller controls the first switch circuit to be in on-state during a first on-period and controls the fifth switch circuit to be in on-state during a second on-period completely including the first on-period. When the voltage between the fifth and sixth terminals has second polarity, the controller controls the second switch circuit to be in on-state during a third on-period and controls the sixth switch circuit to be in on-state during a fourth on-period completely including the third on-period.

11 Claims, 18 Drawing Sheets

(56) References Cited

U.S. PATENT DOCUMENTS

| | | | |
|---|---|---|---|
| 2010/0244773 A1* | 9/2010 | Kajouke | H02M 1/4258 |
| | | | 320/137 |
| 2011/0031927 A1* | 2/2011 | Kajouke | H02J 7/022 |
| | | | 320/108 |
| 2011/0115285 A1* | 5/2011 | Ransom | B60L 11/1811 |
| | | | 307/9.1 |
| 2012/0268078 A1* | 10/2012 | Kajouke | H02M 5/293 |
| | | | 320/166 |

FOREIGN PATENT DOCUMENTS

| | | |
|---|---|---|
| JP | 2006-254694 | 9/2006 |
| JP | 2008-061497 | 3/2008 |

\* cited by examiner ial Field

The present disclosure relates to a power conversion device that converts DC power into AC power.

2. Description of the Related Art

In recent years, the business by which a company or an individual sells electricity obtained from a distributed power source (for example, a solar cell, a fuel cell, or a storage battery) to a power company (electric power sales) has been expanding. Electric power sales are performed by using power system interconnection that connects a distributed power source to the commercial power system. In power system interconnection, the power from the distributed power source is converted into power adapted to the commercial power system by using a power conversion device called a power conditioner.

When the distributed power source is a direct current (DC) power source, a power conversion device that converts DC power to alternating current (AC) power is used in the power system interconnection. As such a power conversion device, for example, a power system interconnection inverter device has been proposed (refer to, for example, Japanese Patent No. 4100125). The power system interconnection inverter device includes a high-frequency transformer, a first inverter disposed on the primary side of the high-frequency transformer, a current-limiting reactor disposed on the secondary side of the high-frequency transformer, and a second inverter having a plurality of switching elements coupled in a full-bridge configuration. The first inverter converts DC power to high frequency power. The current-limiting reactor converts the high frequency power to commercial power. The each of the switching elements of the second inverter is formed from a bidirectional switch, which closes and off a bidirectional switch in accordance with the polarity of the system voltage. Thus, the second inverter converts the power of the high-frequency transformer to an alternating current.

SUMMARY

In existing power conversion devices, reduction in the loss of the power is required.

In one general aspect, the techniques disclosed here feature a power conversion device. The power conversion device includes: first and second terminals connected to a DC power source; third and fourth terminals connected to a commercial power system or a load; a transformer including a primary winding and a secondary winding that has fifth and sixth terminals; an inverter circuit connected between the first and second terminals and the primary winding; a converter circuit; and a control circuit. The converter circuit includes: a first switch circuit including a first switch and a first diode connected in parallel with the first switch, the first switch circuit being connected between the third and fifth terminals; a second switch circuit including a second switch and a second diode connected in parallel with the second switch, the second switch circuit being connected between the fourth and fifth terminals; a third switch circuit including a third switch and a third diode connected in parallel with the third switch, the third switch circuit being connected between the third and sixth terminals; a fourth switch circuit including a fourth switch and a fourth diode connected in parallel with the fourth switch, the fourth switch circuit being connected between the fourth and sixth terminals; a fifth switch circuit including a fifth switch and a fifth diode connected in parallel with the fifth switch, the fifth switch circuit being connected to the first switch circuit in series between the third and fifth terminals, the fifth diode being reversely connected to the first diode; a sixth switch circuit including a sixth switch and a sixth diode connected in parallel with the sixth switch, the sixth switch circuit being connected to the second switch circuit in series between the fourth and fifth terminals, the sixth diode being reversely connected to the second diode; a seventh switch circuit including a seventh switch and a seventh diode connected in parallel with the seventh switch, the seventh switch circuit being connected to the third switch circuit in series between the third and sixth terminals, the seventh diode being reversely connected to the third diode; and an eighth switch circuit including an eighth switch and an eighth diode connected in parallel with the eighth switch, the eighth switch circuit being connected to the fourth switch circuit in series between the fourth and sixth terminals, the eighth diode being reversely connected to the fourth diode. When a voltage between the fifth and sixth terminals has a first polarity, the controller controls the first switch to be in ON state during a first ON period and controls the fifth switch to be in ON state during a second ON period longer than the first ON period, the second ON period completely including the first ON period. When the voltage between the fifth and sixth terminals has a second polarity opposite to the first polarity, the controller controls the second switch to be in ON state during a third ON period and controls the sixth switch to be in ON state during a fourth ON period longer than the third ON period, the fourth ON period completely including the third ON period.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of Present Disclosure

The present inventor has proposed a power conversion device including a primary side inverter circuit and a secondary side inverter circuit on either side of a transformer as described in Japanese Patent No. 4100125 and preventing a circulating current from being generated in the primary side inverter circuit during a period of time in which the power is not output from the secondary side (refer to Japanese Patent Application No. 2015-146194).

Since existing power conversion devices employ a diode rectification method for the secondary side inverter circuit, loss caused by a diode occurs. Accordingly, reduction in the loss is required.

The present disclosure provides a power conversion device including a secondary side inverter circuit using a synchronous rectification method and driving the secondary side inverter circuit by using a novel drive method with higher efficiency than ever.

Exemplary Embodiments

Exemplary embodiments of the present disclosure are described in detail below with reference to the accompanying drawings. It is noted that, in the present disclosure, the terms "first", "second", "third" and the like are used for distinguishing similar components or periods, not for describing temporal or spatial order. The terms "first", "second", "third" and the like are appropriately exchangeable. The present disclosure includes embodiments obtained by appropriately exchanging such ordinal numbers of element names in the following exemplary embodiments, and is not limited to the exemplary embodiments.

Figure 1:
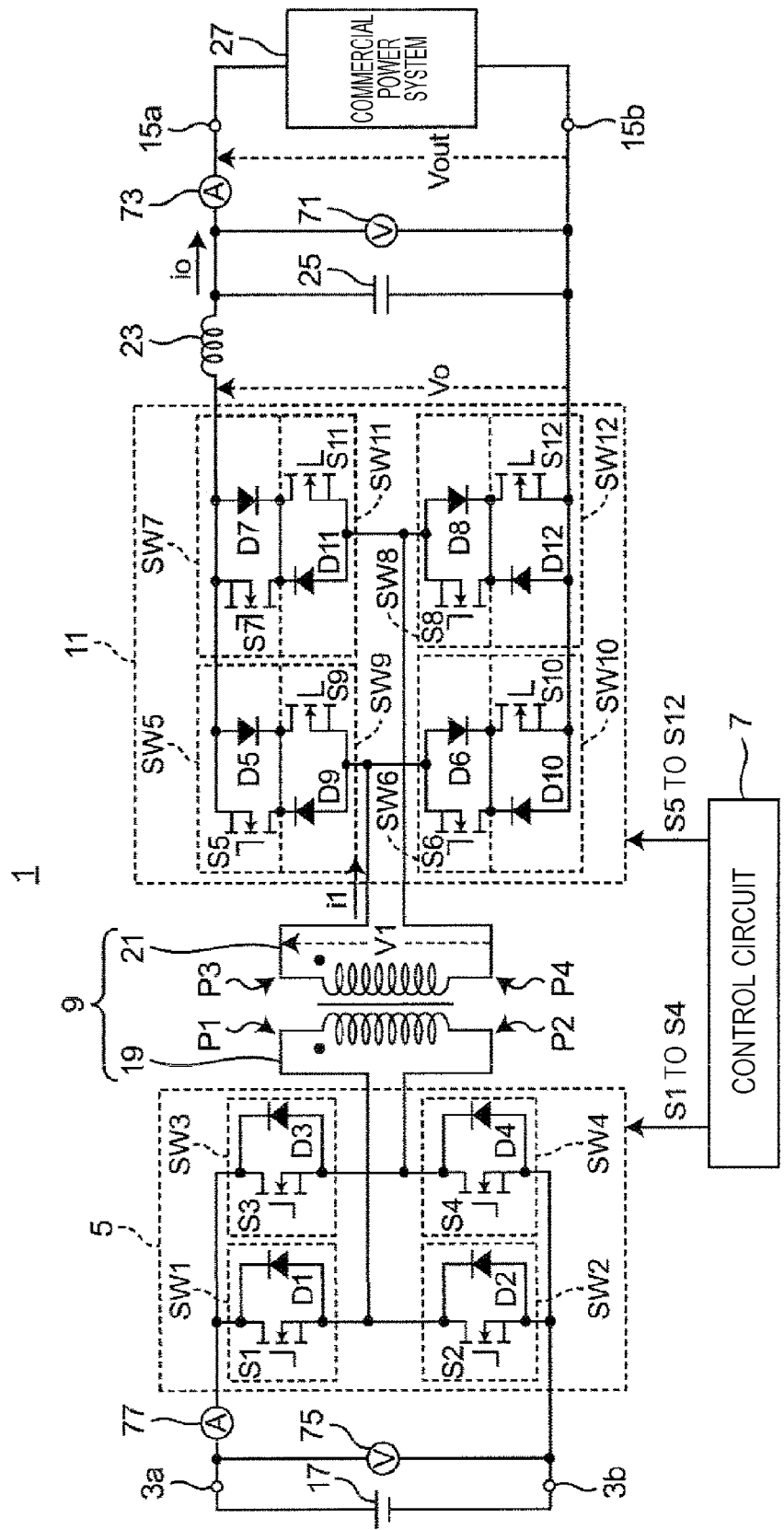
FIG. 1 is a block diagram illustrating the configuration of a power conversion device according to a first exemplary embodiment.

FIG. 1 is a circuit diagram of a power conversion device 1 according to an exemplary embodiment. The power conversion device 1 includes a primary side inverter circuit 5, a transformer 9, a secondary side converter circuit 11, a coil 23, a capacitor 25, voltmeters 71 and 75, ammeters 73 and 77, and a control circuit 7. The power conversion device 1 further includes terminals 3a and 3b connected to a DC power source 17 and terminals 15a and 15b connected to a commercial power system 27. The power conversion device 1 is a power conditioner that bidirectionally converts power between the DC power source 17 and the commercial power system 27 and transmits the power.

The DC power source 17 is, for example, a storage battery, a solar cell, a fuel cell. A positive electrode of the DC power source 17 is electrically connected to the terminal 3a of the power conversion device 1, and a negative electrode of the DC power source 17 is electrically connected to the terminal 3b of the power conversion device 1. The power of the DC power source 17 is supplied to the primary side inverter circuit 5 via the terminals 3a and 3b.

The primary side inverter circuit 5 is connected between the terminals 3a and 3b and the primary winding 19 of the transformer 9. The primary side inverter circuit 5 is a high-frequency inverter that converts a DC voltage supplied from the DC power source 17 into a high-frequency voltage (an AC voltage) of, for example, 20 kHz. The primary side inverter circuit 5 includes four switching elements SW1 to SW4. The switching elements SW1 to SW4 are bridge-connected to form a full-bridge circuit. Each of the switching elements SW1 to SW4 includes one of switches S1 to S4 and one of diodes D1 to D4. The switches S1 to S4 are field effect transistors, for example. Each of the diodes D1 to D4 is connected between the source and the drain of a corresponding one of the switches S1 to S4. That is, each of the diodes D1 to D4 is connected in parallel with the corresponding one of the switches S1 to S4. Each of the diodes D1 to D4 may be a body diode of the corresponding one of the switch S1 to S4 or may be externally connected to the corresponding one of the switches S1 to S4.

The switches S1 to S4 may be, for example, npn insulated gate bipolar transistors instead of the field effect transistors. In this case, the diodes D1, D2, D3, and D4 are provided as freewheeling diodes. The diode D1 is connected between the emitter and the collector of the switch S1 so that a current flows through the diode D1 in a direction opposite to the direction in which a current flows in the switch S1 when the switch S1 is closed. That is, the anode of the diode D1 is connected to the emitter of the switch S1, and the cathode of the diode D1 is connected to the collector of the switch S1. The diodes D2 to D4 are connected to the switches S2 to S4, respectively, in the same manner.

The control circuit 7 opens the switches S2 and S3 when the switches S1 and S4 are closed and closes the switches S2 and S3 when the switches S1 and S4 are open.

The transformer 9 is a high-frequency transformer including a primary winding 19 and a secondary winding 21 magnetically coupled to each other. Terminals P1 and P2 of the primary winding 19 are connected to the output terminals of the primary side inverter circuit 5. Terminals P3 and P4 of the secondary winding 21 are connected to the input terminals of the secondary side converter circuit 11. The transformer 9 insulates the primary side inverter circuit 5 from the secondary side converter circuit 11. When the power conversion device 1 operates in a power supply mode, the transformer 9 supplies the power from the primary side inverter circuit 5 to the secondary side converter circuit 11 therethrough. In contrast, when the power conversion device 1 operates in a power regeneration mode, the transformer 9 regenerates the power from the secondary side converter circuit 11 to the primary side inverter circuit 5 therethrough. These modes are described in more detail below.

The secondary side converter circuit 11 is connected between the secondary winding 21 and the terminals 15a and 15b. The secondary side converter circuit 11 is a direct AC converter that directly converts the high-frequency voltage supplied from the transformer 9 into a commercial AC voltage of 50 Hz or 60 Hz. The secondary side converter circuit 11 includes eight switching elements SW5 to SW12. Each of the switching elements SW5 to SW12 includes one of switches S5 to S12 and one of diodes D5 to D12. The switches S5 to S12 are, for example, MOSFETs. Each of the diodes D5 to D12 is connected between the source and the drain of a corresponding one of the switches S5 to S12. That is, each of the diodes D5 to D12 is connected in parallel with the corresponding one of the switches S5 to S12. Each of the diodes D5 to D12 may be a body diode of the corresponding one of the switch S5 to S12 or may be externally connected to the corresponding one of the switches S5 to S12. By combining the switches S5 to S12 each formed from a MOSFET with the diodes D5 to D12, respectively, the switching elements SW5 to SW12 pass a current in one direction when being open and pass a current bidirectionally when being closed.

As used herein, the switching elements SW5 to SW12 may be referred to as "a first switching element SW5 to an eighth switching element SW12", and the switches S5 to S12 may be referred to as "a first switch S5 to an eighth switch S12. The switching elements SW5 to SW12 are examples of "first to eighth switch circuits" in the present disclosure, and the switches S5 to S12 are examples of "first to eighth switch" in the present disclosure.

The first switching element SW5 and the fifth switching element SW9 are connected in series between the terminal 15a and the terminal P3 so that the direction in which a current flows in the first switching element SW5 and the direction in which a current flows in the fifth switching element SW9 are opposite to each other when being open (that is, the forward directions of the diodes D5 and D9 are opposite to each other). The drains of the first switch S5 and the fifth switch S9 are connected to each other, or the sources thereof are connected to each other. Either the first switching element SW5 or the fifth switching element SW9 may be disposed close to the terminal P3.

The second switching element SW6 and the sixth switching element SW10 are connected in series between the terminal 15b and the terminal P3 so that the direction in which a current flows in the second switching element SW6 and the direction in which a current flows in the sixth switching element SW10 are opposite to each other when being open (that is, the forward directions of the diodes D6 and D10 are opposite to each other). The drains of the second switch S6 and the sixth switch S10 are connected to each other, or the sources thereof are connected to each other. Either the second switching element SW6 or the sixth switching element SW10 may be disposed close to the terminal P3.

The third switching element SW7 and the seventh switching element SW11 are connected in series between the terminal 15a and the terminal P4 so that the direction in which a current flows in the third switching element SW7 and the direction in which a current flows in the seventh switching element SW11 are opposite to each other when being open (that is, the forward directions of the diodes D7 and D11 are opposite to each other). The drains of the third switch S7 and the seventh switch S11 are connected to each other, or the sources thereof are connected to each other. Either the third switching element SW7 or the seventh switching element SW11 may be disposed close to the terminal P4.

The fourth switching element SW8 and the eighth switching element SW12 are connected in series between the terminal 15b and the terminal P4 so that the direction in which a current flows in the fourth switching element SW8 and the direction in which a current flows in the eighth switching element SW12 are opposite to each other when being open (that is, the forward directions of the diodes D8 and D12 are opposite to each other). The drains of the fourth switch S8 and the eighth switch S12 are connected to each other, or the sources thereof are connected to each other. Either the fourth switching element SW8 or the eighth switching element SW12 may be disposed close to the terminal P4.

The first switching element SW5 and the second switching element SW6 are disposed so that the currents flow in the same direction in a path that extends from the terminal 15a to the terminal 15b and that includes the first switching element SW5, the second switching element SW6, the fifth switching element SW9, and the sixth switching element SW10 (that is, the forward directions of the diodes D5 and D6 are the same) when being open.

The third switching element SW7 and the fourth switching element SW8 are disposed so that the currents flow in the same direction in a path that extends from the terminal 15a to the terminal 15b and that includes the third switching element SW7, the fourth switching element SW8, the seventh switching element SW11, and the eighth switching element SW12 (that is, the forward directions of the diodes D7 and D8 are the same) when being open.

The first switching element SW5 and the third switching element SW7 are disposed so that the currents flow in the opposite directions in a path that extends from the terminal P3 to the terminal P4 and that includes the first switching element SW5, the third switching element SW7, the fifth switching element SW9, and the seventh switching element SW11 (that is, the forward directions of the diodes D5 and D7 are opposite to each other) when being open.

The control circuit 7 controls the amplitude of at least one of the output voltage and the output current at the terminals 15a and 15b by switching on/off the first switch S5 to the eighth switch S12. The control is described in more detail below.

The coil 23 is disposed between one of the two output terminals of the secondary side converter circuit 11 and the terminal 15a. The capacitor 25 is connected between the two output terminals of the secondary side converter circuit 11. The coil 23 and the capacitor 25 constitute a filter circuit that smoothes an AC signal output from the secondary side converter circuit 11. In this manner, the pulse wave AC signal output from the secondary side converter circuit 11 is converted into a sine wave AC signal having an amplitude in accordance with the pulse width.

The voltmeter 75 measures the input voltage of the primary side inverter circuit 5 (the voltage between the terminals 3a and 3b) and notifies the control circuit 7 of the value of the input voltage. The ammeter 77 measures the input current of the primary side inverter circuit 5 and notifies the control circuit 7 of the value of the input current.

The voltmeter 71 measures the output voltage (the voltage between the terminals 15a and 15b) of the power conversion device 1 and notifies the control circuit 7 of the value of the output voltage. The ammeter 73 measures the output current of the power conversion device 1 and notifies the control circuit 7 of the value of the output current.

The control circuit 7 controls the primary side inverter circuit 5 and the secondary side converter circuit 11.

When electric power is supplied from the DC power source 17 to the commercial power system 27 (electric power sale) or when the DC power source 17 is charged by the power supplied from the commercial power system 27, the terminals 15a and 15b are connected to the commercial power system 27.

The operation performed by the power conversion device 1 is described below.

The power conversion device 1 operates in either a power supply mode (an inverter mode) for supplying power from the DC power source 17 to the commercial power system 27 or a power regeneration mode for regenerating power from the commercial power system 27 to the DC power source 17 (a converter mode).

Figure 2:
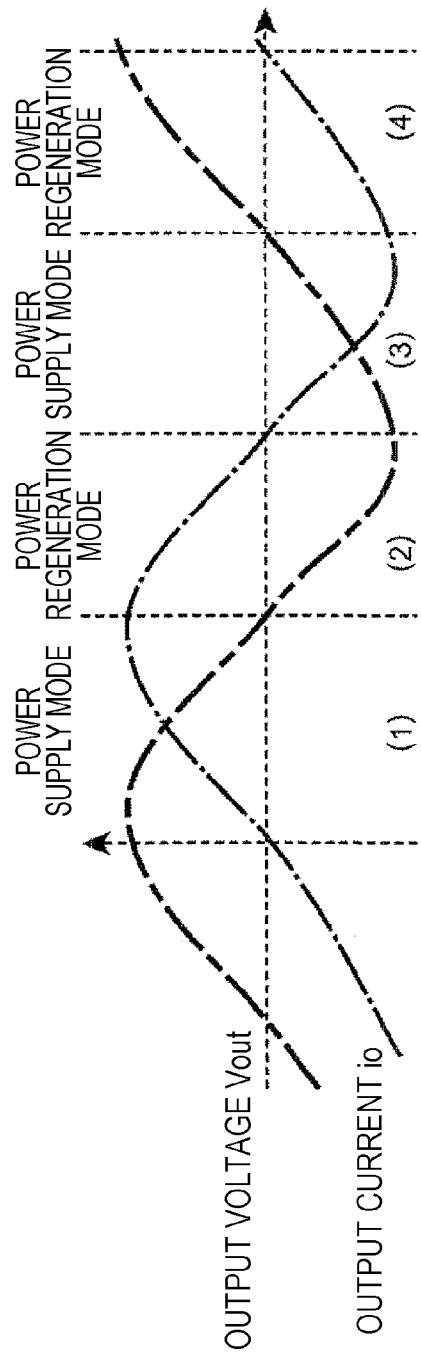
FIG. 2 illustrates a first operation performed by a power conversion device illustrated in FIG. 1 and is a waveform diagram illustrating the waveforms of an output voltage and an output current when the output voltage and the output current have a phase difference of 90 degrees.

FIG. 2 illustrates a first operation performed by the power conversion device 1 illustrated in FIG. 1. More specifically, FIG. 2 is a waveform diagram illustrating the waveforms of the output voltage and the output current in the case where the output voltage and the output current have a phase difference of 90 degrees. That is, FIG. 2 illustrates an example of the waveforms of the output voltage Vout and the output current io output from the terminals 15a and 15b.

When a voltage drop occurs between the terminals 15a and 15b in a direction the same as the direction in which the current flows through the commercial power system 27, that is, when the polarities of the output voltage Vout and the output current io are the same, the power conversion device 1 operates in the power supply mode. There are two types of power supply modes, one mode indicated by "(1)" in which the output voltage Vout and the output current io are positive and the other mode indicated by "(3)" in which the output voltage Vout and the output current io are negative.

When a voltage drop occurs between the terminals 15a and 15b in a direction opposite to the direction in which the current flows through the commercial power system 27, that is, when the polarities of the output voltage Vout and the output current io differ from each other, the power conversion device 1 operates in the power regeneration mode. There are two types of power regeneration modes, one mode indicated by "(2)" in which the output voltage Vout is negative and the output current io is positive and the other mode indicated by "(4)" in which the output voltage Vout is positive and the output current io is negative.

Figure 3:
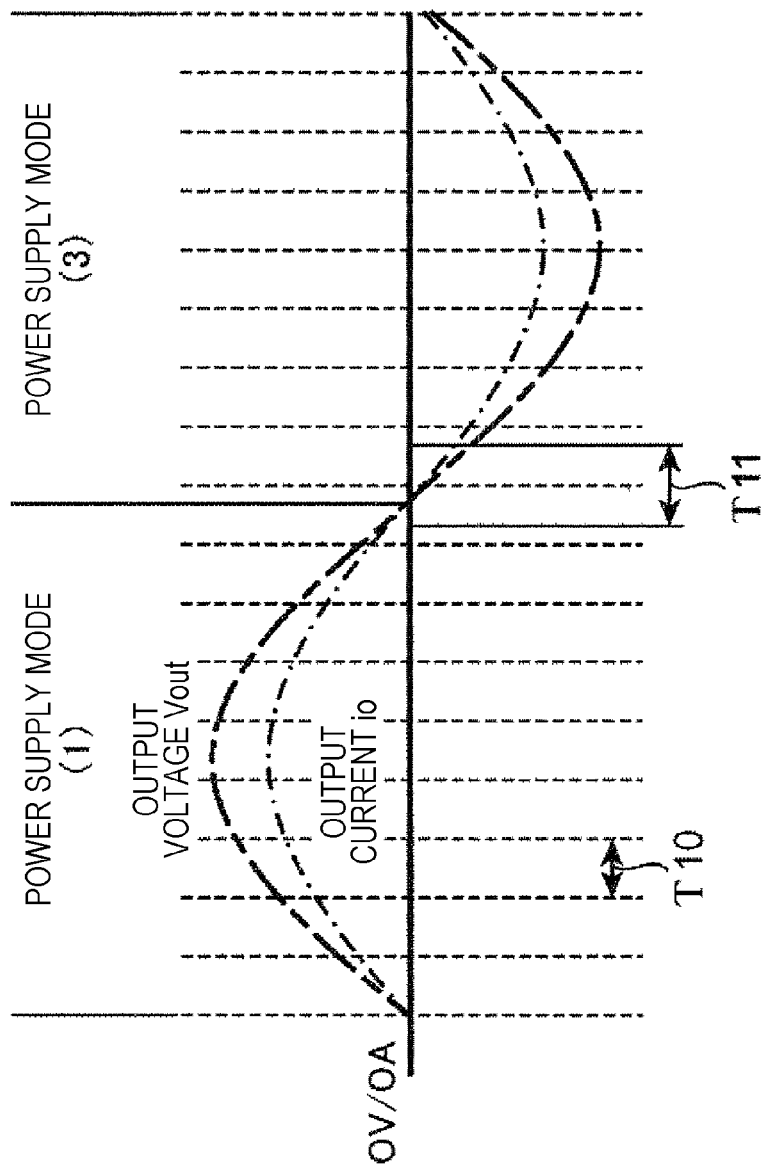
FIG. 3 illustrates a second operation performed by the power conversion device illustrated in FIG. 1 and is a waveform diagram illustrating the waveforms of an output voltage and an output current when the output voltage and the output current have a phase difference of 0 degrees.
Figure 4:
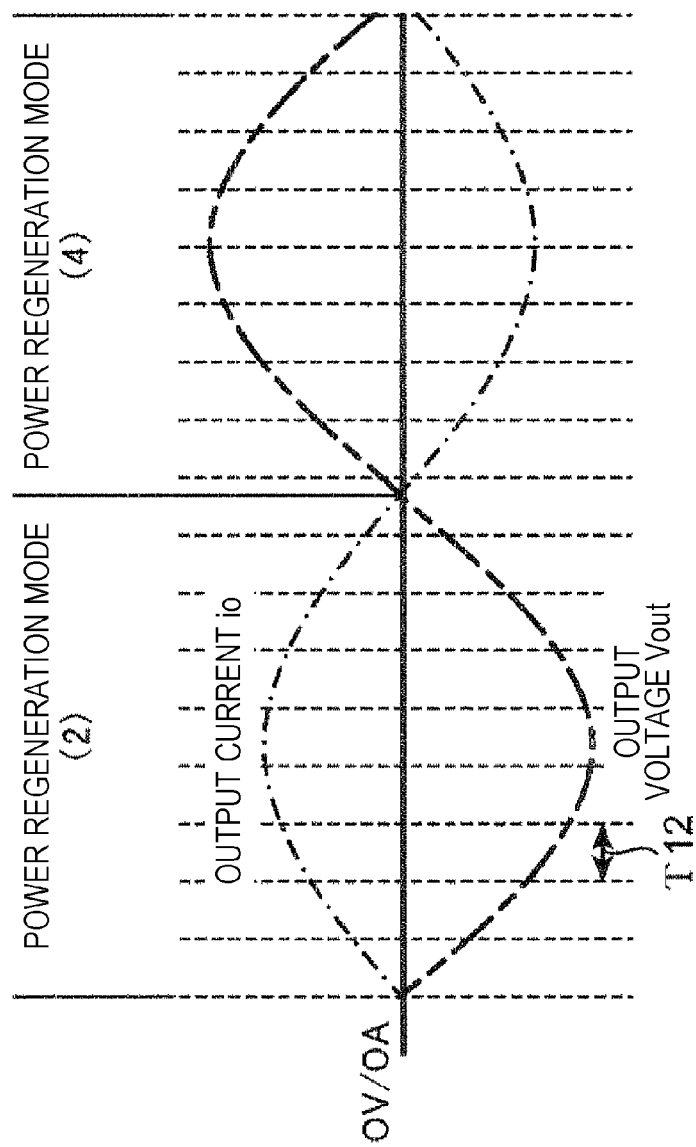
FIG. 4 illustrates a third operation performed by the power conversion device illustrated in FIG. 1 and is a waveform diagram illustrating the waveforms of an output voltage and an output current when the output voltage and the output current have a phase difference of 180 degrees.

FIG. 3 illustrates a second operation performed by the power conversion device 1 illustrated in FIG. 1. More specifically, FIG. 3 is a waveform diagram illustrating the waveforms of the output voltage and the output current in the case where the output voltage and the output current have a phase difference of 0 degrees. FIG. 4 illustrates a third operation performed by the power conversion device 1 illustrated in FIG. 1. More specifically, FIG. 4 is a waveform diagram illustrating the waveforms of the output voltage and the output current in the case where the output voltage and the output current have a phase difference of 180 degrees. When, as illustrated in FIG. 2, the output voltage Vout and the output current io have a phase difference of 90 degrees, the power supply mode and the power regeneration mode alternately occur. In contrast, when, as illustrated in FIG. 3, the output voltage Vout and the output current io have a phase difference of 0 degrees (that is, when the power factor is 1), the power regeneration mode does not occur, and only the power supply mode occurs. In addition, when, as illustrated in FIG. 4, the output voltage Vout and the output current io have a phase difference of 180 degrees (that is, when the power factor is 0), the power supply mode does not occur, and only the power regeneration mode occurs.

Note that although FIG. 2 illustrates the case of the lagging power factor, the power supply mode and the power regeneration mode similarly occur in the case of the leading power factor.

Also, note that the following description is given with reference to the output voltage Vout of the power conversion device 1 and the output voltage Vo of the secondary side converter circuit 11.

Figure 5:
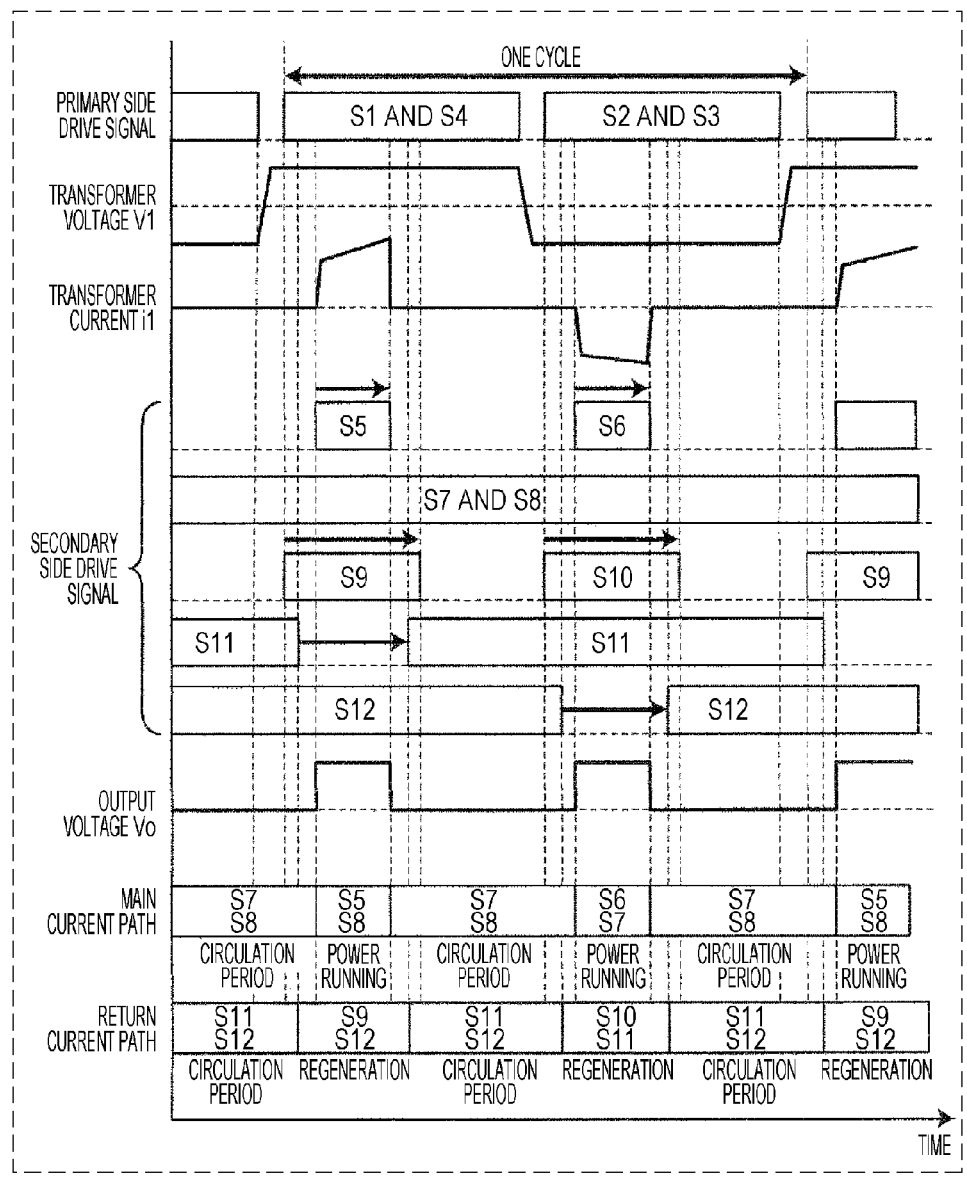
FIG. 5 is a timing diagram illustrating the operation performed by the power conversion device illustrated in FIG. 1 in a power supply mode (1) illustrated in FIG. 2.

FIG. 5 is a timing diagram illustrating the operation performed by the power conversion device 1 in the power supply mode (1) illustrated in FIG. 2. In FIG. 5, the output voltage Vout and the output current io are positive, and the power conversion device 1 operates in the power supply mode.

The primary side drive signal is a control signal applied from the control circuit 7 to the switches S1 to S4 of the primary side inverter circuit 5. The switches S1 to S4 are closed when the primary side drive signal is at a high level and are open when the primary side drive signal is at a low level. In the following description, it is assumed that the duty ratio of the primary side drive signal is fixed. However, the duty ratio may be variable. The transformer voltage V1 is a voltage between the terminals P3 and P4 of the secondary winding 21. Since the waveform of the voltage between the terminals P1 and P2 of the primary winding 19 is similar to the waveform of the voltage between the terminals P3 and P4 of the secondary winding 21, the waveform of the voltage between the terminals P1 and P2 of the primary winding 19 is not illustrated. The transformer current i1 is a current flowing through the secondary winding 21. Since the waveform of the current flowing through the primary winding 19 is the same as the waveform of the current flowing through the secondary winding 21, the waveform of the current flowing through the primary winding 19 is not illustrated. The secondary side drive signals are control signals applied from the control circuit 7 to the first switches S5 to the eighth switch S12 of the secondary side converter circuit 11. Each of the first switch S5 to the eighth switch S12 is closed when the secondary side drive signal is at a high level and is open when the secondary side drive signal is at a low level. The output voltage Vo is the output voltage of the secondary side converter circuit 11.

In the power supply mode and the power regeneration mode, the control circuit 7 opens and closes the switches S1 to S4 of the primary side inverter circuit 5 at a duty ratio of about 50 percent. In this manner, the primary side inverter circuit 5 generates a pulse wave AC signal including a positive voltage period and a negative voltage period having substantially the same time lengths and substantially the same amplitudes at all times. The control circuit 7 controls the secondary side converter circuit 11 in synchronization with the operation of the primary side inverter circuit 5 so as to control the amplitude of the output voltage Vout (that is, to shape the waveform of the output voltage Vo).

In FIG. 5, the transformer current i1 is a current for supplying power from the DC power source 17 to the commercial power system 27.

Referring to FIG. 5, the control circuit 7 closes the first switch S5 for a variable time within a period during which the transformer voltage V1 is positive. In addition, the control circuit 7 closes the fifth switch S9 for at least the period during which the first switch S5 is closed. Furthermore, the control circuit 7 increases or decreases the period of time during which the fifth switch S9 is closed in accordance with an increase or a decrease in the period of time during which the first switch S5 is closed. By closing the fifth switch S9 for at least the period of time during which the first switch S5 is closed, the current flowing from the terminal P3 to the terminal 15a passes through the fifth switch S9 instead of through the diode D9. As a result, the loss is reduced more than in the case where the current flows through the diode D9.

Referring to FIG. 5, during the period in which the transformer voltage V1 is positive, the control circuit 7 closes only one of the first switch S5 and the seventh switch S11 so as to increase or decrease the period of time during which the seventh switch S11 is open in accordance with an increase or a decrease in the period of time during which the first switch S5 is closed. In this manner, the terminals P3 and P4 can be prevented from being short-circuited via the seventh switch S11.

Figure 9:
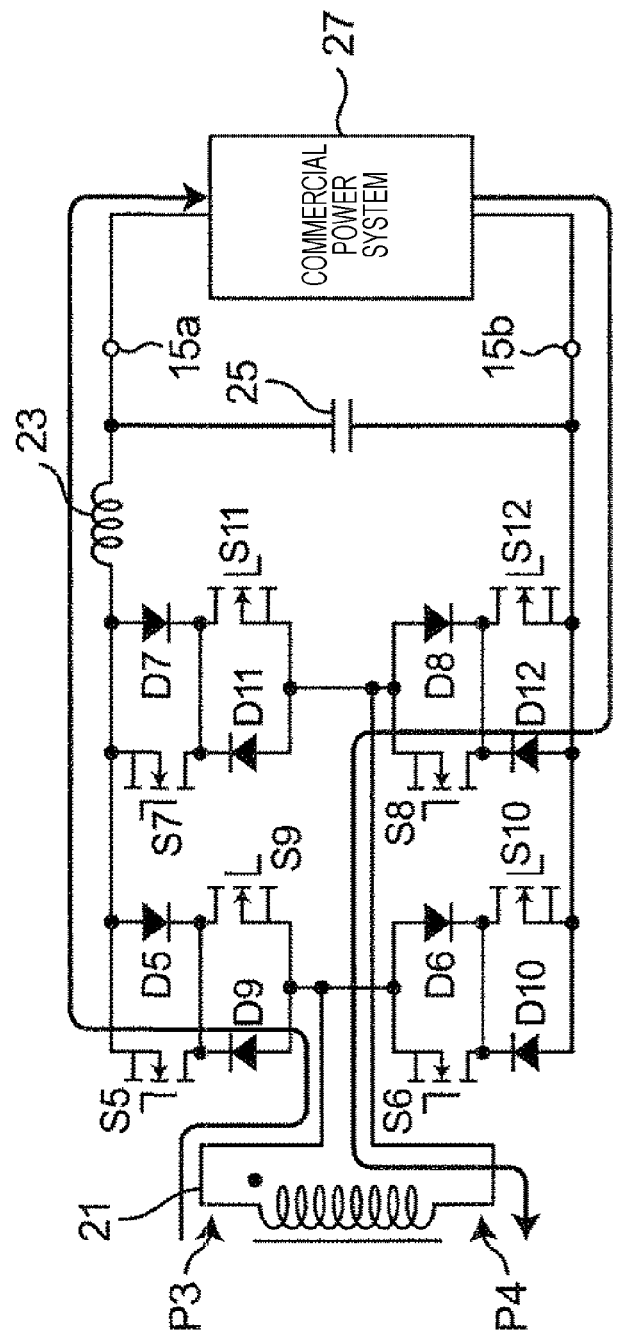
FIG. 9 illustrates a first current path in a secondary side converter circuit illustrated in FIG. 1.

FIG. 9 illustrates a first current path in the secondary side converter circuit 11 illustrated in FIG. 1. According to the operation illustrated in FIG. 5, during the period in which the voltage V1 is positive, when the third switch S7, the fourth switch S8, the fifth switch S9, and the eighth switch S12 are closed and if the second switch S6, the sixth switch S10, and the seventh switch S11 are open, the first switch S5 is closed. At this time, the transformer current i1 flows from the terminal P3 to the terminal P4 via the fifth switch S9, the first switch S5, the commercial power system 27, the eighth switch S12, and the fourth switch S8.

Referring to FIG. 5, the control circuit 7 closes the second switch S6 for a variable time within a period during which the transformer voltage V1 is negative. In addition, the control circuit 7 closes the sixth switch S10 for at least the period during which the second switch S6 is closed. Furthermore, the control circuit 7 increases or decreases the period of time during which the sixth switch S10 is closed in accordance with an increase or a decrease in the period of time during which the second switch S6 is closed. By closing the sixth switch S10 for at least the period during which the second switch S6 is closed, the current flowing from the terminal 15b to the terminal P3 passes through the sixth switch S10 instead of through the diode D10. As a result, the loss is reduced more than in the case where the current flows through the diode D10.

Referring to FIG. 5, during the period in which the transformer voltage V1 is negative, the control circuit 7 closes only one of the second switch S6 and the eighth switch S12 so as to increase or decrease the period of time during which the eighth switch S12 is open in accordance with an increase or a decrease in the period of time during which the second switch S6 is closed. In this manner, the terminals P4 and P3 can be prevented from being short-circuited via the eighth switch S12.

Figure 10:
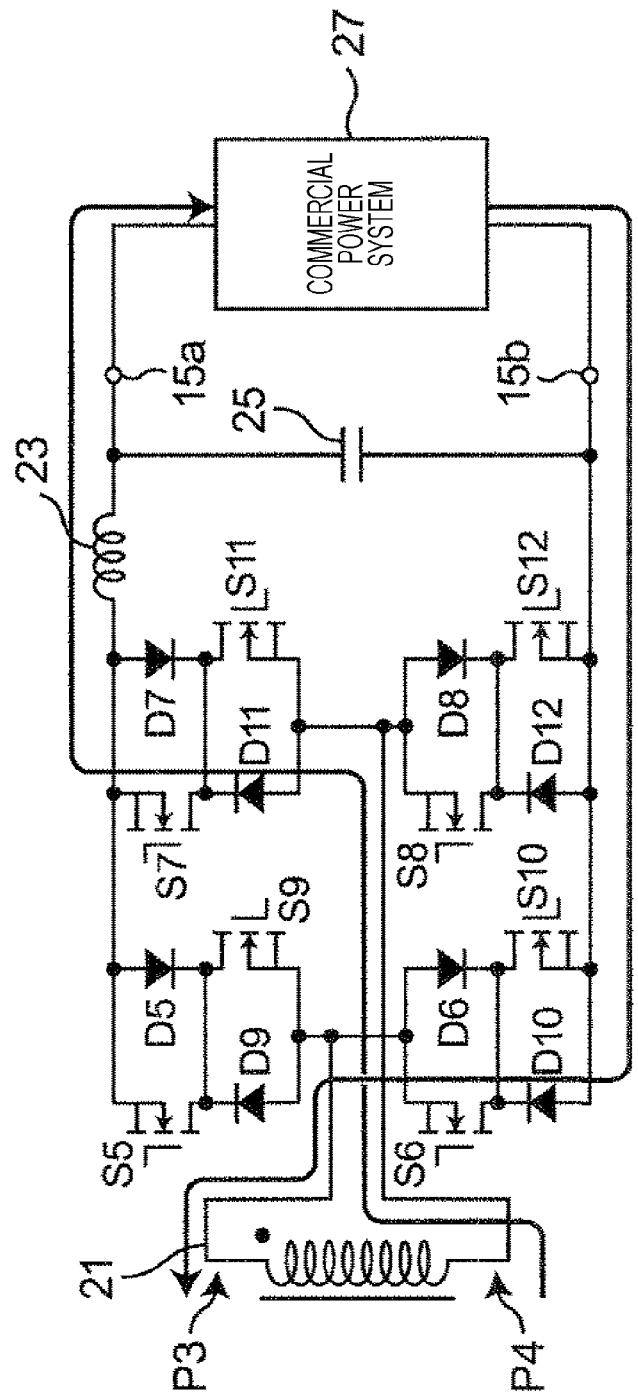
FIG. 10 illustrates a second current path in the secondary side converter circuit illustrated in FIG. 1.

FIG. 10 illustrates a second current path in the secondary side converter circuit 11 illustrated in FIG. 1. According to the operation illustrated in FIG. 5, during the period in which the voltage V1 is negative, when the third switch S7, the fourth switch S8, the sixth switch S10, and the seventh switch S11 are closed and if the first switch S5, the fifth switch S9, and the eighth switch S12 are open, the second switch S6 is closed. At this time, the transformer current i1 flows from the terminal P4 to the terminal P3 via the seventh switch S11, the third switch S7, the commercial power system 27, the sixth switch S10, and the second switch S6.

Referring to FIG. 5, the control circuit 7 closes the third switch S7 and the fourth switch S8 over the entire cycle of the transformer voltage V1 at all times. Thus, when both the first switch S5 and the second switch S6 are open, a circulating current that flows from the terminal 15b to the terminal 15a via the fourth switch S8 and the third switch S7 can be generated.

Figure 11:
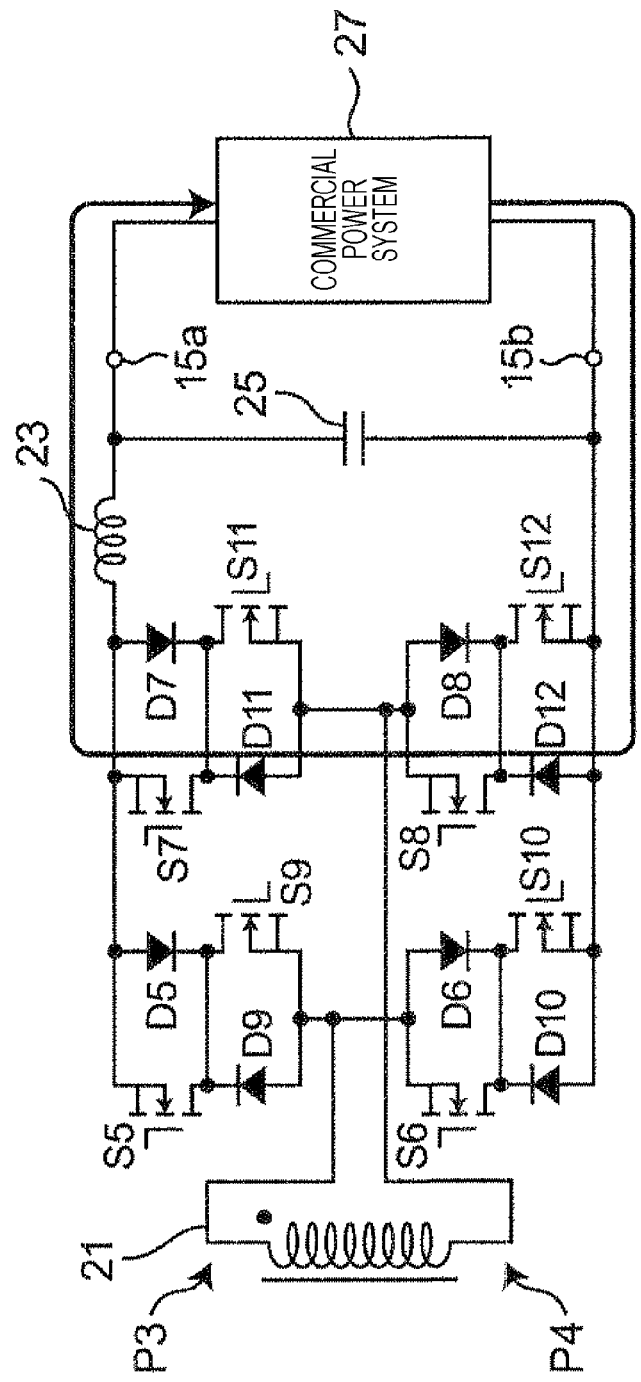
FIG. 11 illustrates a third current path in the secondary side converter circuit illustrated in FIG. 1.

FIG. 11 illustrates a third current path in the secondary side converter circuit 11 illustrated in FIG. 1. According to the operation illustrated in FIG. 5, the third switch S7 and the fourth switch S8 are closed at all times. Therefore, when both the first switch S5 and the second switch S6 are open, a circulating current that flows from the commercial power system 27 and returns to the commercial power system 27 via the diode D12, the fourth switch S8, the diode D11, and the third switch S7 is generated. When the seventh switch S11 is closed, the circulating current flows through the seventh switch S11 instead of through the diode D11. When the eighth switch S12 is closed, the circulating current flows through the eighth switch S12 instead of through the diode D12. Accordingly, the loss is reduced more than in the case where the current flows through the diodes D11 and D12.

Referring to FIG. 5, the control circuit 7 closes at least one of the fifth switch S9 and the seventh switch S11 and closes at least one of the sixth switch S10 and the eighth switch S12 over the entire cycle of the transformer voltage V1. A return current that flows in a direction opposite to the direction of the output current io may be generated due to an unexpected failure of the commercial power system 27 or the like. According to the above-described switching operation, the return current that flows from the terminal 15a toward the secondary side converter circuit 11 can be processed as a regenerative current that flows to the terminal 15b via the secondary winding 21 or as a circulating current that flows toward the terminal 15b without passing through the secondary winding 21.

Figure 12:
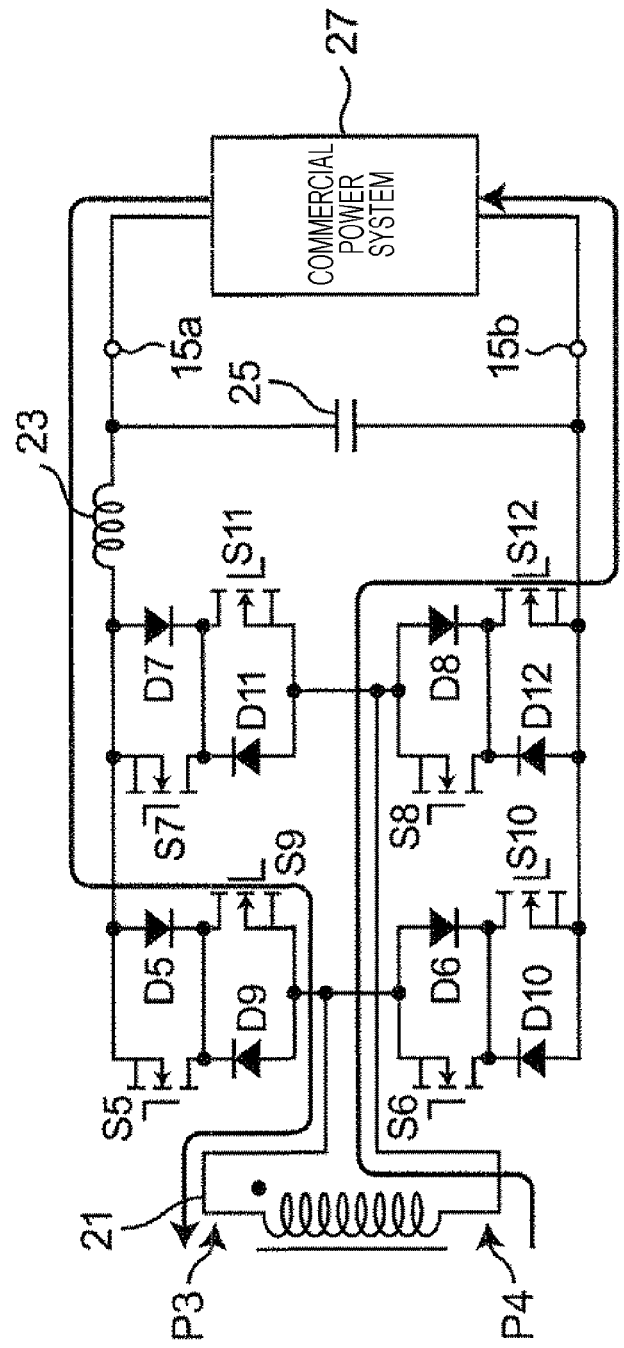
FIG. 12 illustrates a fourth current path in the secondary side converter circuit illustrated in FIG. 1.

FIG. 12 illustrates a fourth current path in the secondary side converter circuit 11 illustrated in FIG. 1. According to the operation illustrated in FIG. 5, during the period in which the transformer voltage V1 is positive, when the fifth switch S9 and the eighth switch S12 are closed and if the sixth switch S10 and the seventh switch S11 are open, the return current flows as a regenerative current. That is, the return current flows from the terminal 15a to the terminal 15b via the diode D5, the fifth switch S9, the secondary winding 21, the diode D8, and the eighth switch S12. The return current is regenerated to the DC power source 17 via the transformer 9 and the primary side inverter circuit 5. The open/close operation of the second switch S6 and the third switch S7 has no impact on the return current. When the first switch S5 is closed, the return current flows through the first switch S5 instead of through the diode D5. When the fourth switch S8 is closed, the return current flows through the fourth switch S8 instead of through the diode D8. As a result, the loss is reduced more than in the case where the current flows through the diodes D5 or D8.

Figure 13:
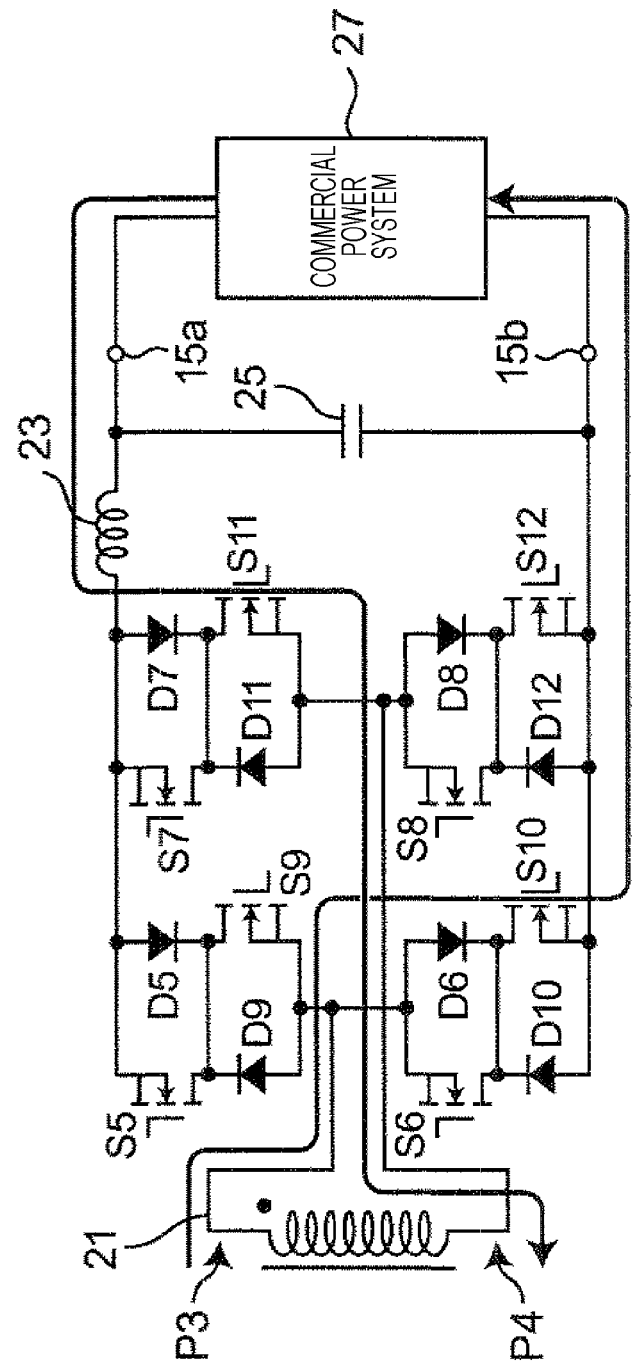
FIG. 13 illustrates a fifth current path in the secondary side converter circuit illustrated in FIG. 1.

FIG. 13 illustrates a fifth current path in the secondary side converter circuit 11 illustrated in FIG. 1. According to the operation illustrated in FIG. 5, during the period in which the transformer voltage V1 is negative, when the sixth switch S10 and the seventh switch S11 are closed and if the fifth switch S9 and the eighth switch S12 are open, the return current flows as a regenerative current. That is, the return current flows from the terminal 15a to the terminal 15b via the diode D7, the seventh switch S11, the secondary winding 21, the diode D6, and the sixth switch S10. The return current is regenerated to the DC power source 17 via the transformer 9 and the primary side inverter circuit 5. The open/close operation of the first switch S5 and the fourth switch S8 has no impact on the return current. When the second switch S6 is closed, the return current flows through the second switch S6 instead of through the diode D6. When the third switch S7 is closed, the return current flows through the third switch S7 instead of through the diode D7. As a result, the loss is reduced more than in the case where the current flows through the diodes D6 or D7.

Figure 14:
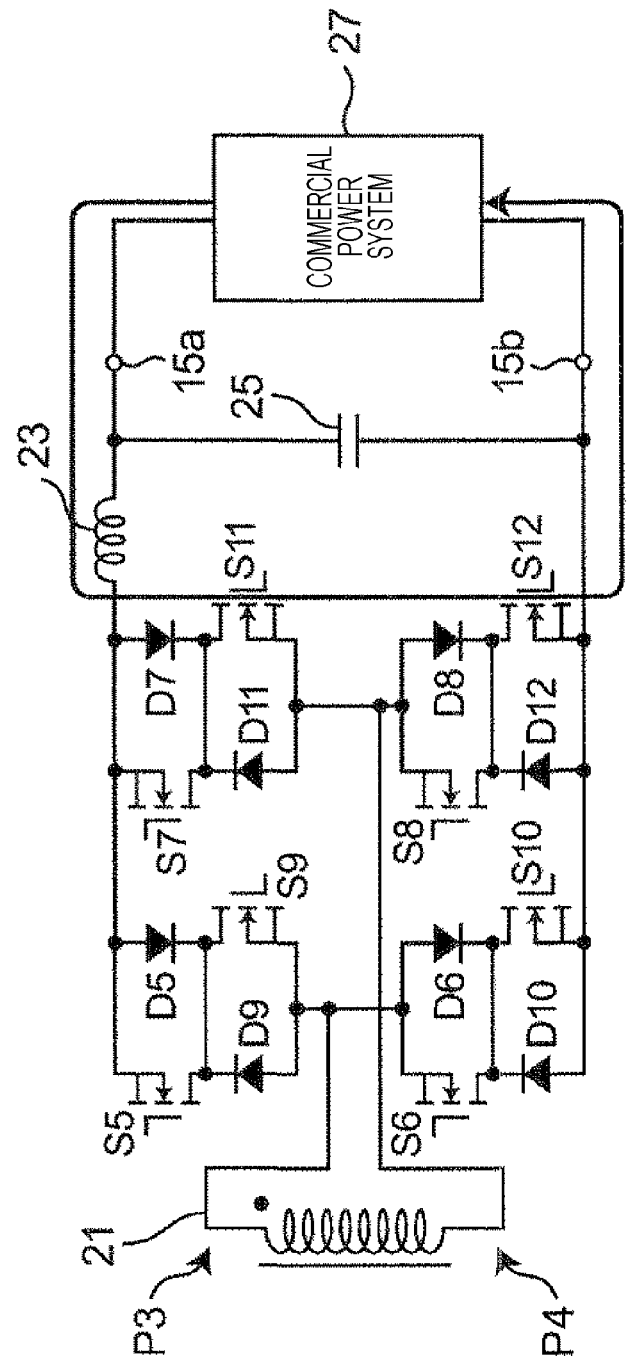
FIG. 14 illustrates a sixth current path in the secondary side converter circuit illustrated in FIG. 1.

FIG. 14 illustrates a sixth current path in the secondary side converter circuit 11 illustrated in FIG. 1. According to the operation illustrated in FIG. 5, when at least one of the fifth switch S9 and the sixth switch S10 is open and if both the seventh switch S11 and the eighth switch S12 are closed, the return current flows as a circulating current. That is, the return current flows from the commercial power system 27 and returns to the commercial power system 27 via the diode D7, the seventh switch S11, the diode D8, and the eighth switch S12. When the third switch S7 is closed, the circulating current flows through the third switch S7 instead of through the diode D7. When the fourth switch S8 is closed, the circulating current flows through the fourth switch S8 instead of through the diode D8. As a result, the loss is reduced more than in the case where the current flows through the diodes D7 or D8.

Figure 6:
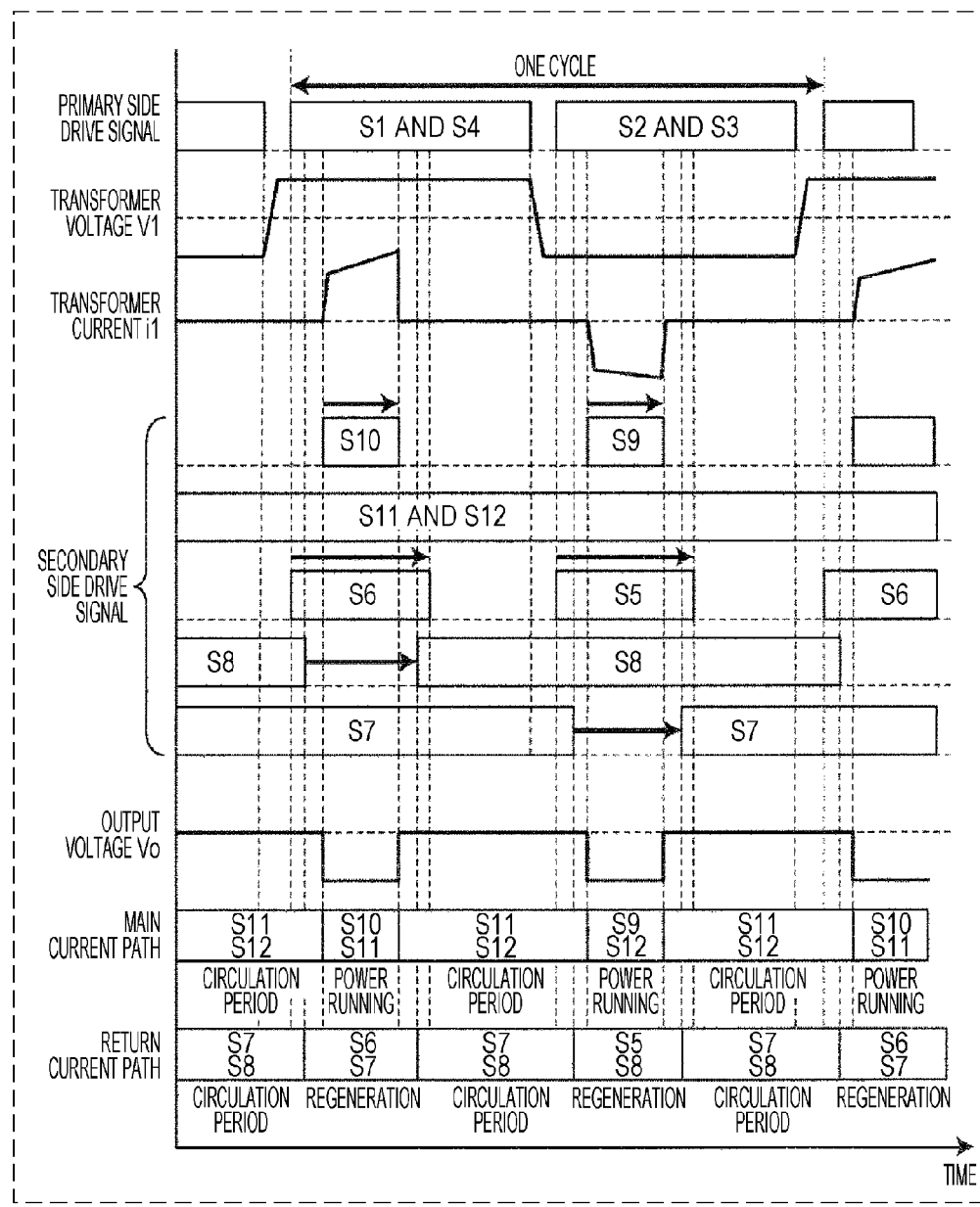
FIG. 6 is a timing diagram illustrating the operation performed by the power conversion device illustrated in FIG. 1 in a power supply mode (3) illustrated in FIG. 2.

FIG. 6 is a timing diagram illustrating the operation performed by the power conversion device 1 in the power supply mode (3) illustrated in FIG. 2. In FIG. 6, the output voltage Vout and the output current io are negative, and the power conversion device 1 operates in the power supply mode.

In FIG. 6, the transformer current i1 is a current for supplying power from the DC power source 17 to the commercial power system 27.

Referring to FIG. 6, during the first period in which the transformer voltage V1 is positive, the control circuit 7 closes the sixth switch S10 for a variable time and closes the second switch S6 for at least a period during which the sixth switch S10 is closed. In addition, the control circuit 7 increases or decreases the period of time during which the second switch S6 is closed in accordance with an increase or a decrease in the period of time during which the sixth switch S10 is closed. By closing the second switch S6 for at least the period during which the sixth switch S10 is closed, the current flowing from the terminal P3 to the terminal 15b passes through the second switch S6 instead of through the diode D6. As a result, the loss is reduced more than in the case where the current flows through the diode D6.

Referring to FIG. 6, during the period in which the transformer voltage V1 is positive, the control circuit 7 closes only one of the fourth switch S8 and the sixth switch S10 so as to increase or decrease the period of time during which the fourth switch S8 is open in accordance with an increase or a decrease in the period of time during which the sixth switch S10 is closed. In this manner, the terminals P3 and P4 can be prevented from being short-circuited via the fourth switch S8.

According to the operation illustrated in FIG. 6, during the period in which the transformer voltage V1 is positive, when the second switch S6, the third switch S7, the seventh switch S11, and the eighth switch S12 are closed and if the first switch S5, the fourth switch S8, and the fifth switch S9 are open, the sixth switch S10 is closed. At this time, the transformer current i1 flows from the terminal P3 to the terminal P4 via the second switch S6, the sixth switch S10, the commercial power system 27, the third switch S7, and the seventh switch S11. Accordingly, the transformer current i1 flows in the path illustrated in FIG. 13.

Referring to FIG. 6, during the second period in which the transformer voltage V1 is negative, the control circuit 7 closes the fifth switch S9 for a variable time, closes the first switch S5 at least during a period in which the fifth switch S9 is closed, and increases or decreases the period of time during which the first switch S5 is closed in accordance with an increase or a decrease in the period of time during which the fifth switch S9 is closed. By closing the first switch S5 for at least the period during which the fifth switch S9 is closed, the current from the terminal 15b to the terminal P3 flows through the first switch S5 instead of through the diode D5. As a result, the loss is reduced more than in the case where the current flows through the diode D5.

Referring to FIG. 6, the control circuit 7 closes only one of the third switch S7 and the fifth switch S9 so as to increase or decrease the period of time during which the third switch S7 is open in accordance with an increase or a decrease in the period of time during which the fifth switch S9 is closed over the entire cycle of the transformer voltage V1. In this manner, the terminals P3 and P4 can be prevented from being short-circuited via the third switch S7.

According to the operation illustrated in FIG. 6, during a period in which the transformer voltage V1 is negative, when the first switch S5, the fourth switch S8, the seventh switch S11, and the eighth switch S12 are closed and if the second switch S6, the third switch S7, and the sixth switch S10 are open, the fifth switch S9 is closed. At this time, the transformer current i1 flows from the terminal P4 to the terminal P3 via the fourth switch S8, the eighth switch S12, the commercial power system 27, the first switch S5, and the fifth switch S9. Accordingly, the transformer current i1 flows in the path illustrated in FIG. 12.

Referring to FIG. 6, the control circuit 7 closes the seventh switch S11 and the eighth switch S12 over the entire cycle of the transformer voltage V1 at all times. Thus, when both the fifth switch S9 and the sixth switch S10 are open, a circulating current that flows from the terminal 15a to the terminal 15b via the seventh switch S11 and the eighth switch S12 can be generated.

According to the operation illustrated in FIG. 6, the seventh switch S11 and the eighth switch S12 are closed at all times. Thus, when both the fifth switch S9 and the sixth switch S10 are open, a circulating current that flows from the commercial power system 27 and returns to the commercial power system 27 via the diode D7, the seventh switch S11, the diode D8, and the eighth switch S12 is generated. When the third switch S7 is closed, the circulating current flows through the third switch S7 instead of through the diode D7. When the fourth switch S8 is closed, the circulating current flows through the fourth switch S8 instead of through the diode D8. In this manner, the loss is reduced more than in the case where the current flows through the diodes D7 or D8. Accordingly, the circulating current flows in the path illustrated in FIG. 14.

Referring to FIG. 6, the control circuit 7 closes at least one of the second switch S6 and the fourth switch S8 and closes at least one of the first switch S5 and the third switch S7 over the entire cycle of the transformer voltage V1. According to the above-described switching operation, the return current that flows from the terminal 15b to the secondary side converter circuit 11 can be processed as a regenerative current that flows to the terminal 15a via the secondary winding 21 or can be processed as a circulating current that flows to the terminal 15*a* without passing through the secondary winding 21.

According to the operation illustrated in FIG. 6, during the period in which the transformer voltage V1 is positive, when the second switch S6 and the third switch S7 are closed and if the first switch S5 and the fourth switch S8 are open, the return current flows as a regenerative current. That is, the return current flows from the terminal 15*b* to the terminal 15*a* via the diode D10, the second switch S6, the secondary winding 21, the diode D11, and the third switch S7. The return current is regenerated to the DC power source 17 via the transformer 9 and the primary side inverter circuit 5. The open/close operation of the fifth switch S9 and the eighth switch S12 has no impact on the return current. When the sixth switch S10 is closed, the return current flows through the sixth switch S10 instead of through the diode D10. When the seventh switch S11 is closed, the return current flows through the seventh switch S11 instead of through the diode D11. In this manner, the loss is reduced more than in the case where the current flows through the diodes D10 or D11. Accordingly, the return current flows in the path illustrated in FIG. 10.

According to the operation illustrated in FIG. 6, during the period in which the transformer voltage V1 is negative, when the first switch S5 and the fourth switch S8 are closed and the second switch S6 and the third switch S7 are open, the return current flows as a regenerative current. That is, the return current flows from the terminal 15*b* to the terminal 15*a* via the diode D12, the fourth switch S8, the secondary winding 21, the diode D9, and the first switch S5. The return current is regenerated to the DC power source 17 via the transformer 9 and the primary side inverter circuit 5. The open/close operation of the sixth switch S10 and the seventh switch S11 has no impact on the return current. When the fifth switch S9 is closed, the return current flows through the fifth switch S9 instead of through the diode D9. When the eighth switch S12 is closed, the return current flows through the eighth switch S12 instead of through the diode D12. In this manner, the loss is reduced more than in the case where the current flows through the diodes D9 or D12. Accordingly, the return current flows in the path illustrated in FIG. 9.

According to the operation illustrated in FIG. 6, when at least one of the first switch S5 and the second switch S6 is open and both the third switch S7 and the fourth switch S8 are closed, the return current flows as a circulating current. That is, the return current flows from the commercial power system 27 and returns to the commercial power system 27 via the diode D12, the fourth switch S8, the diode D11, and the third switch S7. When the seventh switch S11 is closed, the circulating current flows through the seventh switch S11 instead of through the diode D11. When the eighth switch S12 is closed, the circulating current flows through the eighth switch S12 instead of through the diode D12. In this manner, the loss is reduced more than in the case where the current flows through the diodes D11 or D12. Accordingly, the return current flows in the path illustrated in FIG. 11.

Figure 7:
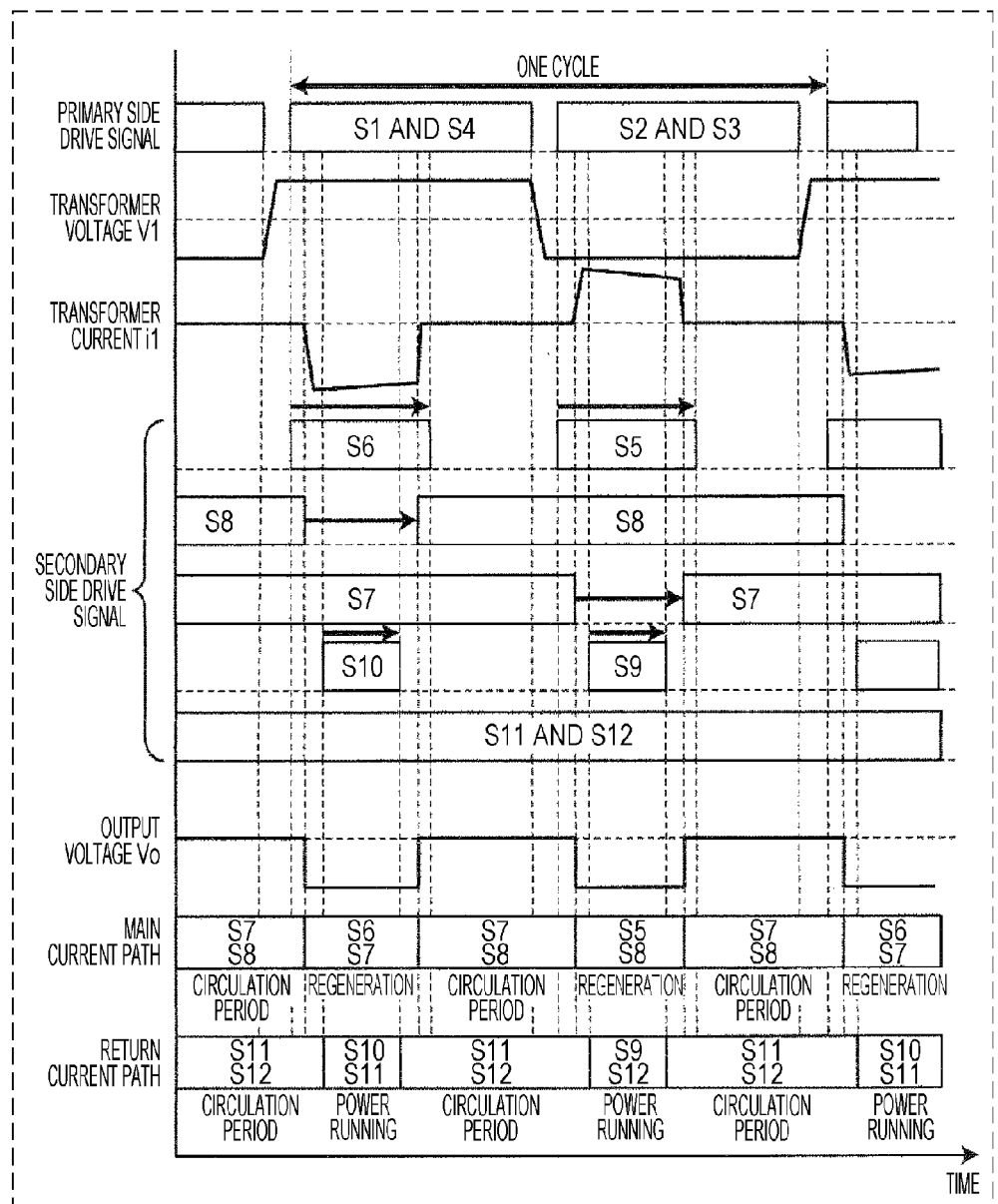
FIG. 7 is a timing diagram illustrating the operation performed by the power conversion device illustrated in FIG. 1 in a power regeneration mode (2) illustrated in FIG. 2.

FIG. 7 is a timing diagram illustrating the operation performed by the power conversion device 1 in the power regeneration mode (2) illustrated in FIG. 2. In FIG. 7, the output voltage Vout is negative, the output current io is positive, and the power conversion device 1 operates in the power regeneration mode.

In FIG. 7, the transformer current i1 is a current for regenerating power from the commercial power system 27 to the DC power source 17.

Referring to FIG. 7, during a first period in which the transformer voltage V1 is positive, the control circuit 7 opens the fourth switch S8 for a variable time and closes only one of the fourth switch S8 and the sixth switch S10. Thus, the control circuit 7 increases or decreases the period of time during which the sixth switch S10 is closed in accordance with the increase or decrease in the period of time during which the fourth switch S8 is open.

Referring to FIG. 7, during the period in which the transformer voltage V1 is positive, the control circuit 7 closes the second switch S6 for at least the period during which the fourth switch S8 is open and increases or decreases the period of time during which the second switch S6 is closed in accordance with the increase or decrease in the period of time during which the fourth switch S8 is open.

According to the operation illustrated in FIG. 7, during the period in which the transformer voltage V1 is positive, when the second switch S6, the third switch S7, the fourth switch S8, the seventh switch S11, and the eighth switch S12 are closed and if the first switch S5 and the fifth switch S9 are open, the fourth switch S8 is open. At this time, the transformer current i1 flows from the terminal 15*b* to the terminal 15*a* via the diode D10, the second switch S6, the secondary winding 21, the seventh switch S11, and the third switch S7. When the sixth switch S10 is closed, the current flows through the sixth switch S10 instead of through the diode D10. In this manner, the loss is reduced more than in the case where the current flows through the diode D10. Accordingly, the transformer current i1 flows in the path illustrated in FIG. 10.

Referring to FIG. 7, during a second period in which the transformer voltage V1 is negative, the control circuit 7 opens the third switch S7 for a variable time and closes only one of the third switch S7 and the fifth switch S9. Thus, the control circuit 7 increases or decreases the period of time during which the fifth switch S9 is closed in accordance with the increase or decrease in the period of time during which the third switch S7 is open.

Referring to FIG. 7, during the period in which the transformer voltage V1 is negative, the control circuit 7 closes the first switch S5 for at least the period during which the third switch S7 is open and increases or decreases the period of time during which the first switch S5 is closed in accordance with the period of time during which the third switch S7 is open.

According to the operation illustrated in FIG. 7, during the period in which the transformer voltage V1 is negative, when the first switch S5, the third switch S7, the fourth switch S8, the seventh switch S11, and the eighth switch S12 are closed and if the second switch S6 and the sixth switch S10 are open, the third switch S7 is open. At this time, the transformer current i1 flows from the terminal 15*b* to the terminal 15*a* via the eighth switch S12, the fourth switch S8, the secondary winding 21, the diode D9, and the first switch S5. When the fifth switch S9 is closed, the current flows through the fifth switch S9 instead of through the diode D9. In this manner, the loss is reduced more than in the case where the current flows through the diode D9. Accordingly, the transformer current i1 flows in the path illustrated in FIG. 9.

Referring to FIG. 7, the control circuit 7 closes the seventh switch S11 and the eighth switch S12 over the entire cycle of the transformer voltage V1 at all times.

According to the operation illustrated in FIG. 7, the seventh switch S11 and the eighth switch S12 are closed at all times. Accordingly, when both the third switch S7 and the fourth switch S8 are closed and at least one of the first switch S5 and the second switch S6 is open, a circulating current that flows form the commercial power system 27 and returns to the commercial power system 27 via the eighth switch S12, the fourth switch S8, the seventh switch S11, and the third switch S7 is generated. Since the seventh switch S11 is closed, the circulating current flows through the seventh switch S11 instead of through the diode D11. In addition, since the eighth switch S12 is closed, the circulating current flows through the eighth switch S12 instead of through the diode D12. In this manner, the loss is reduced more than in the case where the current flows through the diodes D11 or D12. Accordingly, the circulating current flows in the path illustrated in FIG. 11.

Referring to FIG. 7, the control circuit 7 closes at least one of the fifth switch S9 and the seventh switch S11 and closes at least one of the sixth switch S10 and the eighth switch S12 over the entire cycle of the transformer voltage V1.

According to the operation illustrated in FIG. 7, during the period in which the transformer voltage V1 is positive, when the sixth switch S10 and the seventh switch S11 are closed and if the first switch S5 and the fourth switch S8 are open, the return current flows as a power running current (a current for supplying power from the DC power source 17 to the commercial power system 27). That is, the return current flows from the terminal 15a to the terminal 15b via the diode D7, the seventh switch S11, the secondary winding 21, the diode D6, and the sixth switch S10. The return current is supplied to the commercial power system 27. The open/close operation of the fifth switch S9 and the eighth switch S12 has no impact on the return current. When the second switch S6 is closed, the return current flows through the second switch S6 instead of through the diode D6. When the third switch S7 is closed, the return current flows through the third switch S7 instead of through the diode D7. In this manner, the loss is reduced more than in the case where the current flows through the diodes D6 or D7. Accordingly, the return current flows in the path illustrated in FIG. 13.

According to the operation illustrated in FIG. 7, during the period in which the transformer voltage V1 is negative, when the fifth switch S9 and the eighth switch S12 are closed and if the second switch S6 and the third switch S7 are open, the return current flows as a power running current. That is, the return current flows from the terminal 15a to the terminal 15b via the diode D5, the fifth switch S9, the secondary winding 21, the diode D8, and the eighth switch S12. The return current is supplied to the commercial power system 27. The open/close operation of the sixth switch S10 and the seventh switch S11 has no impact on the return current. When the first switch S5 is closed, the return current flows through the first switch S5 instead of through the diode D5. When the fourth switch S8 is closed, the return current flows through the fourth switch S8 instead of through the diode D8. In this manner, the loss is reduced more than in the case where the current flows through the diodes D5 or D8. Accordingly, the regenerative current flows in the path illustrated in FIG. 12.

According to the operation illustrated in FIG. 7, when both the fifth switch S9 and the sixth switch S10 are open and if both the seventh switch S11 and the eighth switch S12 are closed, the return current flows as a circulating current. That is, the return current flows from the commercial power system 27 and returns to the commercial power system 27 via the diode D7, the seventh switch S11, the diode D8, and the eighth switch S12. When the third switch S7 is closed, the circulating current flows through the third switch S7 instead of through the diode D7. When the fourth switch S8 is closed, the circulating current flows through the fourth switch S8 instead of through the diode D8. In this manner, the loss is reduced more than in the case where the current flows through the diodes D7 or D8. Accordingly, the circulating current flows in the path illustrated in FIG. 14.

Figure 8:
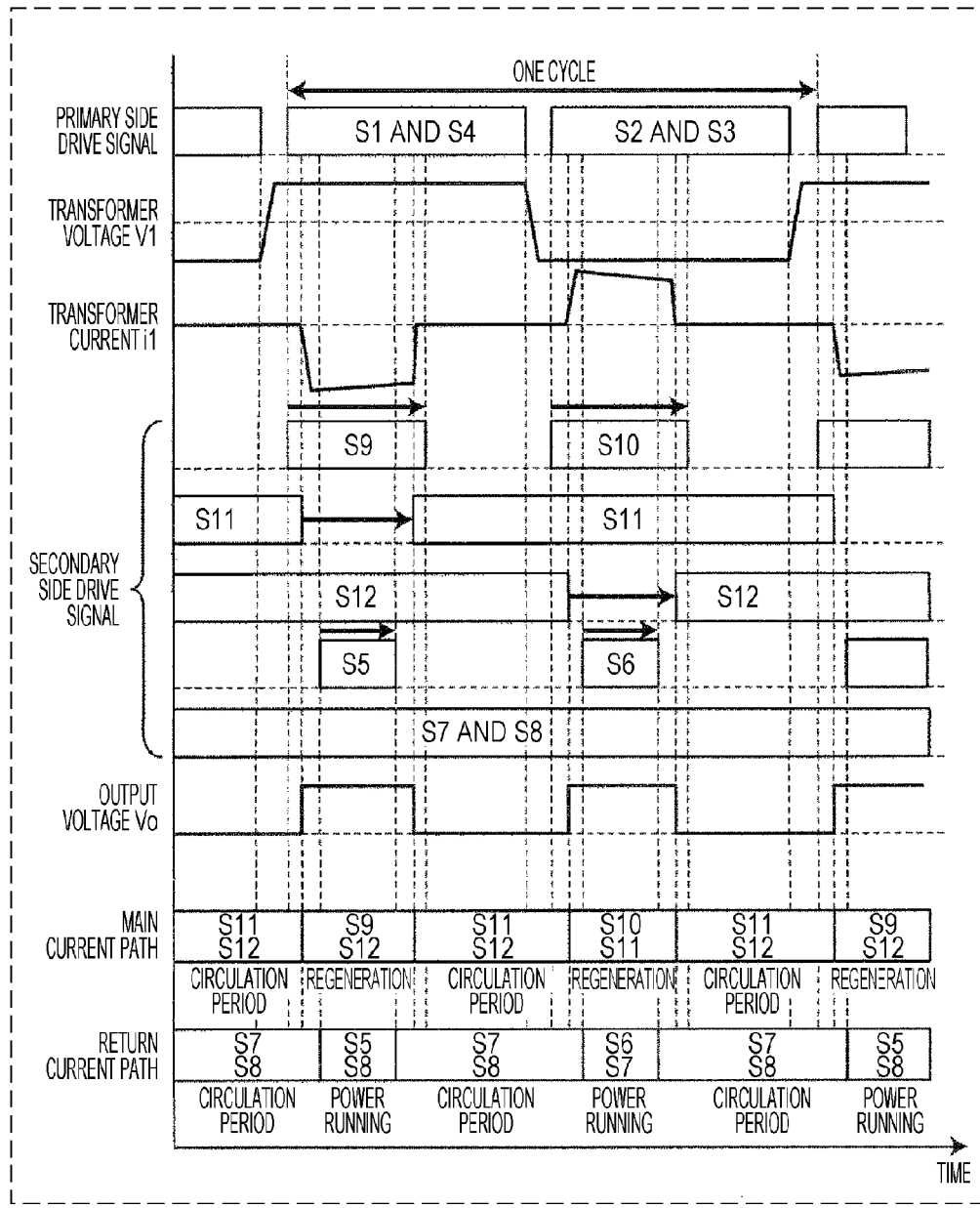
FIG. 8 is a timing diagram illustrating the operation performed by the power conversion device illustrated in FIG. 1 in a power regeneration mode (4) illustrated in FIG. 2.

FIG. 8 is a timing diagram illustrating the operation performed by the power conversion device 1 in the power regeneration mode (4) illustrated in FIG. 2. In FIG. 8, the output voltage Vout is positive, the output current io is negative, and the power conversion device 1 operates in the power regeneration mode.

In FIG. 8, the transformer current i1 is a current for regenerating power from the commercial power system 27 to the DC power source 17.

Referring to FIG. 8, during the first period in which the transformer voltage V1 is positive, the control circuit 7 opens the seventh switch S11 for a variable time and closes only one of the first switch S5 and the seventh switch S11. In addition, the control circuit 7 increases or decreases the period of time during which the first switch S5 is closed in accordance with the increase or decrease in the period of time during which the seventh switch S11 is open.

Referring to FIG. 8, during the period in which the transformer voltage V1 is positive, the control circuit 7 closes the fifth switch S9 for at least the period during which the seventh switch S11 is open and increases or decreases the period of time during which the fifth switch S9 is closed in accordance with an increase or a decrease in the period of time during which the seventh switch S11 is open.

According to the operation illustrated in FIG. 8, during the period in which the transformer voltage V1 is positive, when the third switch S7, the fourth switch S8, the fifth switch S9, the seventh switch S11, and the eighth switch S12 are closed and if the second switch S6 and the sixth switch S10 are open, the seventh switch S11 is open. At this time, the transformer current i1 flows from the terminal 15a to the terminal 15b via the diode D5, the fifth switch S9, the secondary winding 21, the fourth switch S8, and the eighth switch S12. When the first switch S5 is closed, the current flows through the first switch S5 instead of through the diode D5. In this manner, the loss is reduced more than in the case where the current flows through the diode D5. Accordingly, the transformer current i1 flows in the path illustrated in FIG. 12.

Referring to FIG. 8, during the second period in which the transformer voltage V1 is negative, the control circuit 7 opens the eighth switch S12 for a variable time, closes only one of the second switch S6 and the eighth switch S12, and increases or decreases the period of time during which the second switch S6 is closed in accordance with an increase or a decrease in the period of time during which the eighth switch S12 is open.

Referring to FIG. 8, during the period in which the transformer voltage V1 is negative, the control circuit 7 closes the sixth switch S10 for at least the period during which the eighth switch S12 is open and increases or decreases the period of time during which the sixth switch S10 is closed in accordance with an increase or a decrease in the period of time during which the eighth switch S12 is open.

According to the operation illustrated in FIG. 8, during the period in which the transformer voltage V1 is negative, when the third switch S7, the fourth switch S8, the sixth switch S10, the seventh switch S11, and the eighth switch S12 are closed and if the first switch S5 and the fifth switch S9 are open, the eighth switch S12 is open. At this time, the transformer current i1 flows from the terminal 15a to the terminal 15b via the third switch S7, the seventh switch S11, the secondary winding 21, the diode D6, and the sixth switch S10. When the second switch S6 is closed, the current flows through the second switch S6 instead of through the diode D6. In this manner, the loss is reduced more than in the case where the current flows through the diode D6. Accordingly, the transformer current i1 flows in the path illustrated in FIG. 13.

Referring to FIG. 8, the control circuit 7 closes the third switch S7 and the fourth switch S8 over the entire cycle of the transformer voltage V1 at all times.

According to the operation illustrated in FIG. 8, the third switch S7 and the fourth switch S8 are closed at all times. Accordingly, when both the seventh switch S11 and the eighth switch S12 are closed and at least one of the fifth switch S9 and the sixth switch S10 is open, a circulating current that flows from the commercial power system 27 and returns to the commercial power system 27 via the third switch S7, the seventh switch S11, the fourth switch S8, and the eighth switch S12 is generated. Since the third switch S7 is closed, the circulating current flows through the third switch S7 instead of through the diode D7. Since the fourth switch S8 is closed, the circulating current flows through the fourth switch S8 instead of through the diode D8. In this manner, the loss is reduced more than in the case where the current flows through the diodes D7 or D8. Accordingly, the circulating current flows in the path illustrated in FIG. 14.

Referring to FIG. 8, the control circuit 7 closes at least one of the first switch S5 and the third switch S7 and closes at least one of the second switch S6 and the fourth switch S8 over the entire cycle of the transformer voltage V1.

According to the operation illustrated in FIG. 8, during a period in which the transformer voltage V1 is positive, when the first switch S5 and the fourth switch S8 are closed and if the sixth switch S10 and the seventh switch S11 are open, the return current flows as a power running current (a current for supplying power from the DC power source 17 to the commercial power system 27). That is, the return current flows from the terminal 15*b* to the terminal 15*a* via the diode D12, the fourth switch S8, the secondary winding 21, the diode D9, and the first switch S5. The return current is supplied to the commercial power system 27. The open/close operation of the second switch S6 and the third switch S7 has no impact on the return current. When the fifth switch S9 is closed, the return current flows through the first switch S9 instead of through the diode D9. When the eighth switch S12 is closed, the return current flows through the eighth switch S12 instead of through the diode D12. In this manner, the loss is reduced more than in the case where the current flows through the diodes D9 or D12. Accordingly, the return current flows in the path illustrated in FIG. 9.

According to the operation illustrated in FIG. 8, during the period in which the transformer voltage V1 is negative, when the second switch S6 and the third switch S7 are closed and if the fifth switch S9 and the eighth switch S12 are open, the return current flows as a power running current. That is, the return current flows from the terminal 15*b* to the terminal 15*a* via the diode D10, the second switch S6, the secondary winding 21, the diode D11, and the third switch S7. The return current is supplied to the commercial power system 27. The open/close operation of the first switch S5 and the fourth switch S8 has no impact on the return current. When the sixth switch S10 is closed, the return current flows through the sixth switch S10 instead of through the diode D10. When the seventh switch S11 is closed, the return current flows through the seventh switch S11 instead of through the diode D11. In this manner, the loss is reduced more than in the case where the current flows through the diodes D10 or D11. Accordingly, the return current flows in the path illustrated in FIG. 10.

According to the operation illustrated in FIG. 8, when both the first switch S5 and the second switch S6 are open and both the third switch S7 and the fourth switch S8 are closed, the return current flows as a circulating current. That is, the return current flows from the commercial power system 27 and returns to the commercial power system 27 via the diode D12, the fourth switch S8, the diode D11, and the third switch S7. When the seventh switch S11 is closed, the circulating current flows through the seventh switch S11 instead of through the diode D11. When the eighth switch S12 is closed, the circulating current flows through the eighth switch S12 instead of through the diode D12. In this manner, the loss is reduced more than in the case where the current flows through the diodes D11 or D12. Accordingly, the circulating current flows in the path illustrated in FIG. 11.

The operations illustrated in FIG. 5 and the operation illustrated in FIG. 8 are substantially the same. As can be seen from FIG. 5 and FIG. 8, regardless of a direction in which the transformer current i1 flows, the secondary side converter circuit 11 generates a positive output voltage Vo in substantially the same manner. In addition, the operations illustrated in FIG. 6 and the operation illustrated in FIG. 7 are substantially the same. As can be seen from FIG. 6 and FIG. 7, regardless of a direction in which the transformer current i1 flows, the secondary side converter circuit 11 generates a negative output voltage Vo in substantially the same manner.

The amplitude of the output voltage Vout and the amplitude of the output current io of the power conversion device 1 increase and decrease in accordance with the increase and decrease in the period of time during which the first switch S5 and the second switch S6 are closed in the operation illustrated in FIG. 5. Similarly, the amplitude of the output voltage Vout and the amplitude of the output current io of the power conversion device 1 increase and decrease in accordance with the increase and decrease in the period of time during which the sixth switch S10 and the fifth switch S9 are closed in the operation illustrated in FIG. 6.

The amplitudes of the voltage and the current of the power regenerated from the commercial power system 27 to the DC power source 17 increase and decrease in accordance with the increase and decrease in the period of time during which the third switch S7 and the fourth switch S8 are open in the operation illustrated in FIG. 7. Similarly, the amplitudes of the voltage and the current of the power regenerated from the commercial power system 27 to the DC power source 17 increase or decrease in accordance with the increase and decrease in the period of time during which the seventh switch S11 and the eighth switch S12 are open in the operation illustrated in FIG. 8.

According to the present exemplary embodiment, the power conversion device 1 is a power conversion device including a secondary side inverter circuit using a synchronous rectification method, and the power conversion device 1 is capable of operating the secondary side inverter circuit using a novel drive method with higher efficiency than ever. In particular, the secondary side converter circuit 11 includes the switching elements SW5 to SW12 formed from MOSFETs and performs synchronous rectification by using the switching elements SW5 to SW12. Thus, the power conversion efficiency can be improved.

According to the power conversion device 1 of the present exemplary embodiment, a phase jump that may occur in the power system interconnection can be handled. In addition, according to the power conversion device 1 of the present exemplary embodiment, a return current generated when the load is switched off can be processed.

According to the power-system interconnection inverter device described in Japanese Patent No. 4100125, electric power is not regenerated on the primary side. Accordingly, in the power-system interconnection inverter device, when the DC power source 17 is a storage battery, it is difficult to recharge the storage battery. In contrast, according to the power conversion device 1 of the present exemplary embodiment, electric power can be regenerated from the commercial power system 27 to the DC power source 17, so that the storage battery can be recharged when the DC power source 17 is a storage battery. According to the power conversion device 1 of the present exemplary embodiment, even when, for example, a low-power-factor load, a motor, or a rectification load is connected to the power conversion device 1, an autonomous operation of the power conversion device 1 is available. To provide an autonomous operation, it is necessary for the power conversion device 1 to perform voltage control. In general, when voltage control is applied to a low-power-factor load, a motor, or a rectification load, it is unclear whether the current flows in the power supply direction or in the regeneration direction. According to the power conversion device 1 of the present exemplary embodiment, as illustrated in FIGS. 5 to 8, power can be supplied and regenerated in substantially the same sequence, so that the voltage can be advantageously controlled without taking into account the direction in which the current flows.

In addition, according to the power conversion device 1 of the present exemplary embodiment, the high-frequency power generated by the primary side inverter circuit 5 is directly converted into alternating currents of different frequencies without converting the high-frequency power into the DC power by the secondary side converter circuit 11. Accordingly, the low-loss, compact, and lightweight power conversion device 1 can be provided.

Modifications

Power conversion devices according to modifications of the present exemplary embodiment are described below with reference to FIGS. 15 to 18.

Figure 15:
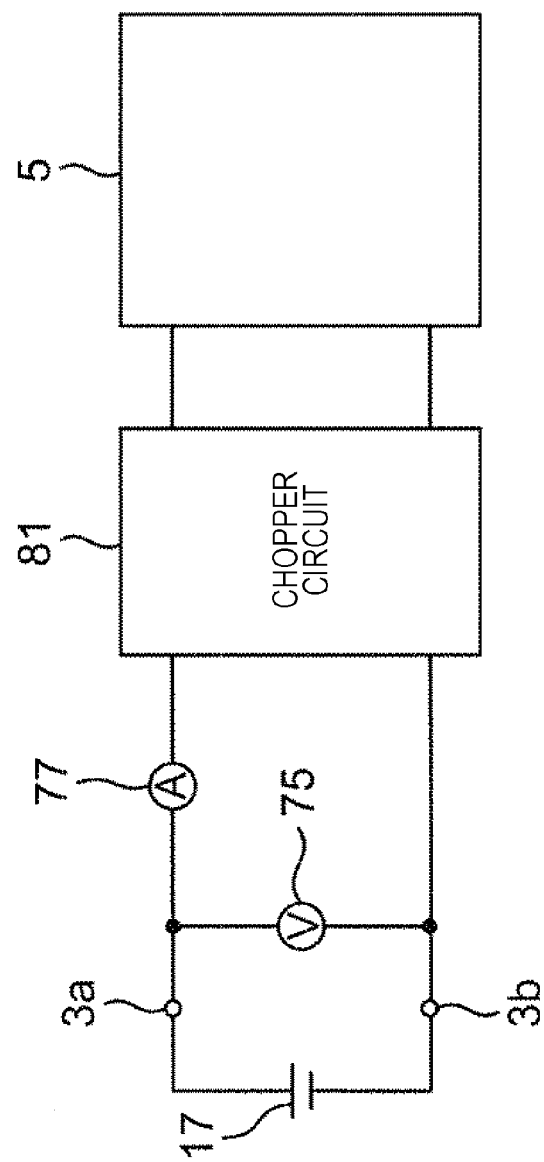
FIG. 15 is a circuit diagram of part of the power conversion device according to a first modification of an exemplary embodiment.

FIG. 15 is a circuit diagram of part of the power conversion device 1 according to a first modification of the exemplary embodiment. As illustrated in FIG. 15, the power conversion device includes a primary side inverter circuit 5 and a chopper circuit 81 disposed between the terminals 3a and 3b in addition to the constituent elements of the power conversion device 1 illustrated in FIG. 1.

The chopper circuit 81 is a step-up/step-down chopper circuit that performs a step-up operation in a power supply mode and performs a step-down operation in a power regeneration mode. By controlling the chopper circuit 81 and the secondary side converter circuit 11, the control circuit 7 controls the amplitude of at least one of the output voltage Vout and the output current io.

The power conversion device illustrated in FIG. 15 includes the chopper circuit 81 so as to be capable of flexibly operating even when the DC power source 17 with a voltage that significantly varies. The power conversion device illustrated in FIG. 15 allows a DC power source with a voltage that significantly varies, such as an electric vehicle (EV) battery, a solar cell, or a fuel cell, to be connected thereto.

Figure 16:
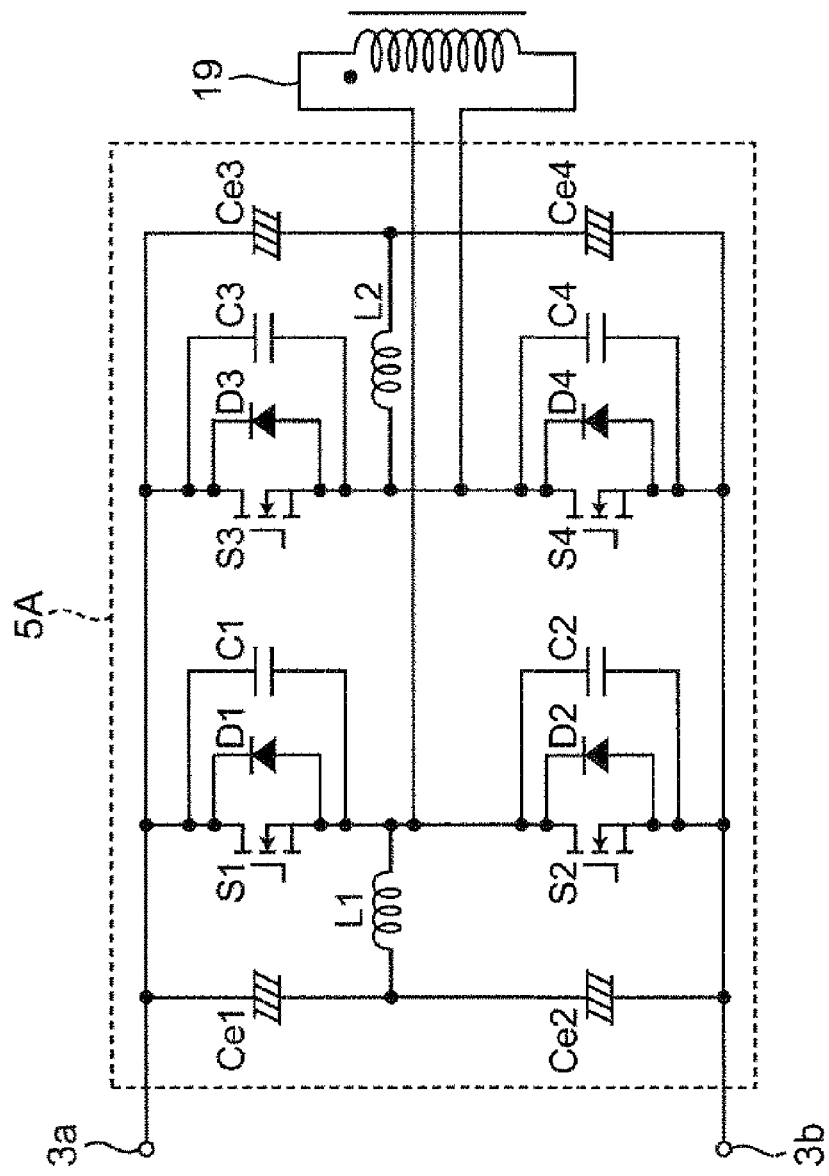
FIG. 16 is a circuit diagram of a primary side inverter circuit of a power conversion device according to a second modification of the exemplary embodiment.

FIG. 16 is a circuit diagram of a primary side inverter circuit 5A of a power conversion device 1c according to a second modification of the exemplary embodiment. The primary side inverter circuit 5A of the power conversion device 1 includes capacitors C1 to C4, exciting inductors L1 and L2, and electrolytic capacitors Ce1 to Ce4.

The capacitors C1 to C4 are lossless snubber capacitors. Each of the capacitors C1 to C4 is connected between the source and the drain of one of the switches S1 to S4.

The electrolytic capacitors Ce1 and Ce2 are connected in series between the terminals 3a and 3b. A node between the electrolytic capacitors Ce1 and Ce2 and a node between the switches S1 and S2 are connected to each other via the exciting inductor L1.

The electrolytic capacitors Ce3 and Ce4 are connected in series between the terminals 3a and 3b. A node between the electrolytic capacitors Ce3 and Ce4 and a node between the switches S3 and S4 are connected to each other via the exciting inductor L2.

In the primary side inverter circuit 5A, soft switching is achieved by the capacitors C1 to C4, the exciting inductors L1 and L2, and the electrolytic capacitors Ce1 to Ce4. Thus, the switches S1 to S4 are protected.

Figure 17:
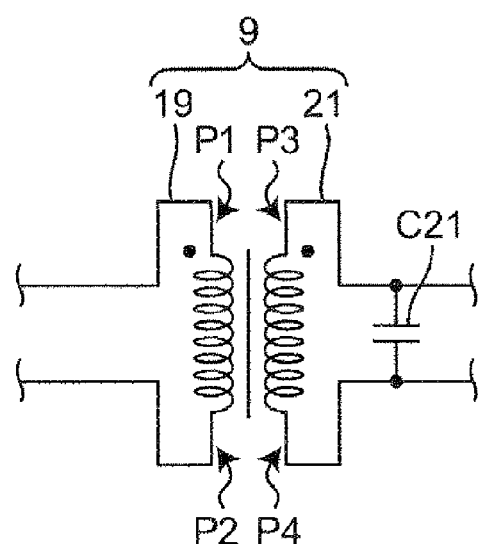
FIG. 17 is a circuit diagram of a transformer of a power conversion device according to a third modification of the exemplary embodiment.

FIG. 17 is a circuit diagram of a transformer 9 of a power conversion device 1 according to a third modification of the exemplary embodiment. As illustrated in FIG. 17, the transformer 9 further includes a capacitor C21 connected between the terminals P3 and P4. According to the configuration illustrated in FIG. 17, the capacitor C21 and the transformer 9 can cause resonance to occur. Thus, a voltage serge occurring in the switching element can be more effectively suppressed.

Figure 18:
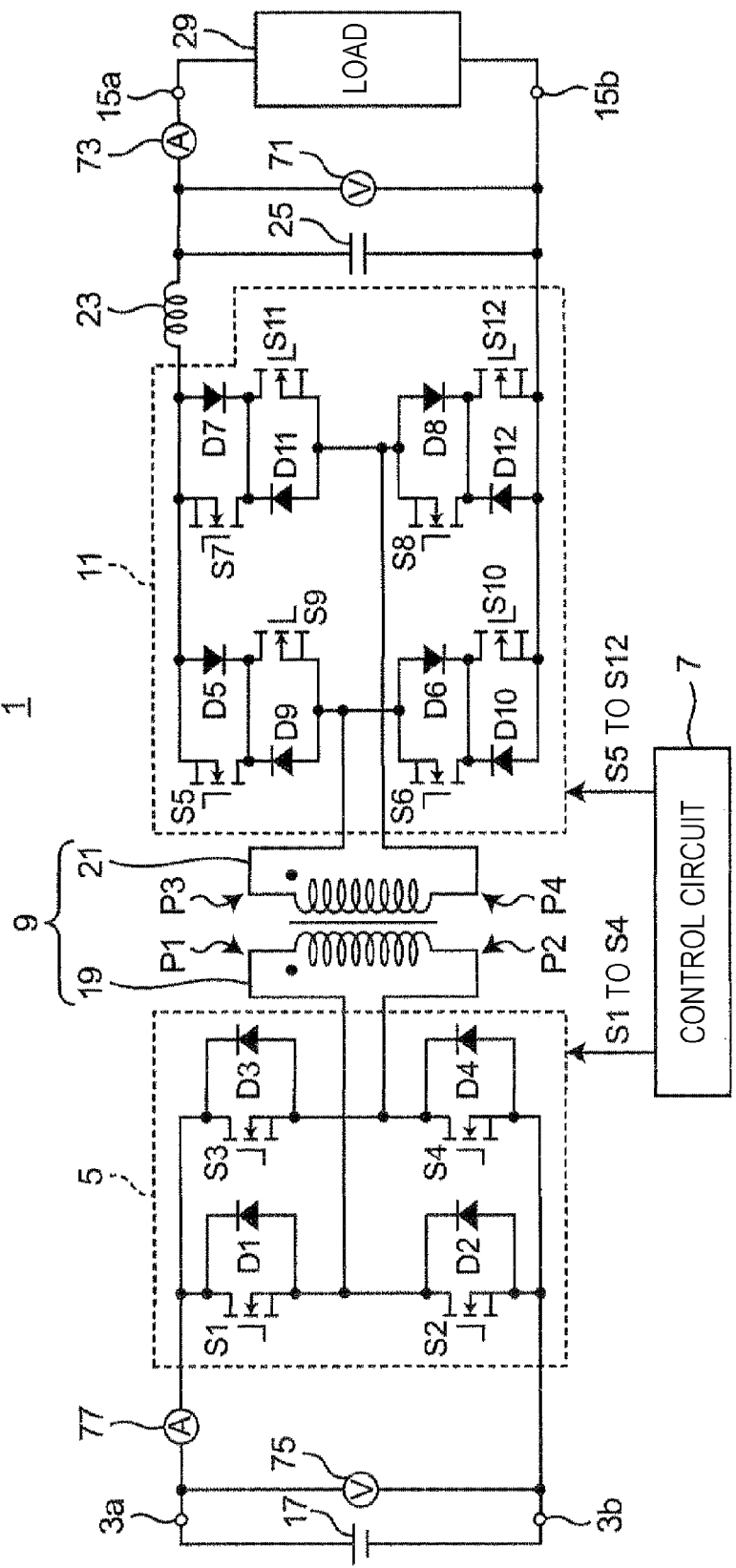
FIG. 18 is a circuit diagram of a power conversion device according to a fourth modification of the exemplary embodiment.

FIG. 18 is a circuit diagram of a power conversion device 1 according to a fourth modification of the exemplary embodiment. The terminals 15a and 15b of the power conversion device 1 may be connected to a load 29 instead of being connected to the commercial power system 27. The load 29 may be a resistance load with a power factor of 1 or an inductive load or a capacitive load with a power factor of less than 1. When the load 29 is connected to the terminals 15a and 15b, the power conversion device 1 supplies the power from the DC power source 17 to the load 29 (e.g., a home appliance).

According to the operations illustrated in FIGS. 5 to 8, electric power can be supplied to not only a resistive load having a power factor of 1 but also a nonlinear load, such as a motor or a rectifier.

The power conversion device according to the present disclosure is characterized by having the configurations described below.

Configuration 1

A power conversion device includes first and second terminals connected to a DC power source, third and fourth terminals connected to one of a commercial power system and a load, a transformer including a primary winding and a secondary winding having fifth and sixth terminals, a primary side inverter circuit connected between the first and second terminals and the primary winding, a secondary side converter circuit connected between the fifth and sixth terminals and the third and fourth terminals, and a control circuit.

The secondary side converter circuit includes first to eighth switching elements each including a diode and a switch connected in parallel with the diode.

The first and fifth switching elements are connected in series between the third and fifth terminals so that forward directions of the diodes of the first and fifth switching elements are opposite, the second and sixth switching elements are connected in series between the fourth and fifth terminals so that forward directions of the diodes of the second and sixth switching elements are opposite, the third and seventh switching elements are connected in series between the third and sixth terminals so that forward directions of the diodes of the third and seventh switching elements are opposite, the fourth and eighth switching elements are connected in series between the fourth and sixth terminals so that forward directions of the diodes of the fourth and eighth switching elements are opposite, the first and second switching elements are disposed in series between the third and fourth terminals so that forward directions of the diodes of the first and second switching elements are the same, the third and fourth switching elements are disposed in series between the third and fourth terminals so that forward directions of the diodes of the third and fourth switching elements are the same, and the first and third switching elements are disposed and connected in series between the fifth and sixth terminals so that forward directions of the diodes of the first and third switching elements are opposite.

Within a first period in which a voltage of the fifth terminal has a first polarity based on a voltage of the sixth terminal, the control circuit closes the first switching element during a third period and closes the fifth switching element during a fourth period that is longer than the third period and that completely includes the third period.

Within a second period in which the voltage of the fifth terminal has a second polarity that is opposite to the first polarity based on the voltage of the sixth terminal, the control circuit closes the second switching element during a fifth period and closes the sixth switching element during a sixth period that is longer than the fifth period and that completely includes the fifth period.

Configuration 2

In the power conversion device according to Configuration 1, the control circuit increases or decreases the fourth period in accordance with an increase or a decrease in the third period and increases or decreases the sixth period in accordance with an increase or a decrease in the fifth period.

Configuration 3

In the power conversion device according to Configuration 1, within the first period, the control circuit opens the seventh switching element during a seventh period that is longer than the third period and that completely includes the third period.

Within the second period, the control circuit opens the eighth switching element during an eighth period that is longer than the fifth period and that completely includes the fifth period.

Configuration 4

In the power conversion device according to Configuration 3, the control circuit increases or decreases the seventh period in accordance with an increase or a decrease in the third period and increases or decreases the eighth period in accordance with an increase or a decrease in the fifth period.

Configuration 5

In the power conversion device according to any one of Configurations 1 to 4, the control circuit closes the third and fourth switching elements at all times during both the first and second periods.

Configuration 6

In the power conversion device according to any one of Configurations 1 to 5, the fourth period is longer than the seventh period and completely includes the seventh period, and the sixth period is longer than the eighth period and completely includes the eighth period.

Configuration 7

A power conversion device includes first and second terminals connected to a DC power source, third and fourth terminals connected to one of a commercial power system and a load, a transformer including a primary winding and a secondary winding having fifth and sixth terminals, a primary side inverter circuit connected between the first and second terminals and the primary winding, a secondary side converter circuit connected between the fifth and sixth terminals and the third and fourth terminals, and a control circuit.

The secondary side converter circuit includes first to eighth switching elements each including a diode and a switch connected in parallel with the diode.

The first and fifth switching elements are connected in series between the third and fifth terminals so that forward directions of the diodes of the first and fifth switching elements are opposite, the second and sixth switching elements are connected in series between the fourth and fifth terminals so that forward directions of the diodes of the second and sixth switching elements are opposite, the third and seventh switching elements are connected in series between the third and sixth terminals so that forward directions of the diodes of the third and seventh switching elements are opposite, the fourth and eighth switching elements are connected in series between the fourth and sixth terminals so that forward directions of the diodes of the fourth and eighth switching elements are opposite, the first and second switching elements are disposed in series between the third and fourth terminals so that forward directions of the diodes of the first and second switching elements are the same, the third and fourth switching elements are disposed in series between the third and fourth terminals so that forward directions of the diodes of the third and fourth switching elements are the same, and the first and third switching elements are disposed and connected in series between the fifth and sixth terminals so that forward directions of the diodes of the first and third switching elements are opposite.

Within a first period in which a voltage of the fifth terminal has a first polarity based on a voltage of the sixth terminal, the control circuit closes the sixth switching element during a third period and closes the second switching element during a fourth period that is longer than the third period and that completely includes the third period.

Within a second period in which the voltage of the fifth terminal has a second polarity that is opposite to the first polarity based on the voltage of the sixth terminal, the control circuit closes the fifth switching element during a fifth period and closes the first switching element during a sixth period that is longer than the fifth period and that completely includes the fifth period.

Configuration 8

In the power conversion device according to Configuration 7, the control circuit increases or decreases the fourth period in accordance with an increase or a decrease in the third period and increases or decreases the sixth period in accordance with an increase or a decrease in the fifth period.

Configuration 9

In the power conversion device according to Configuration 7, within the first period, the control circuit opens the fourth switching element during a seventh period that is longer than the third period and that completely includes the third period.

Within the second period, the control circuit opens the third switching element during an eighth period that is longer than the fifth period and that completely includes the fifth period.

Configuration 10

In the power conversion device according to Configuration 9, the control circuit increases or decreases the seventh period in accordance with an increase or a decrease in the third period and increases or decreases the eighth period in accordance with an increase or a decrease in the fifth period.

Configuration 11

In the power conversion device according to any one of Configurations 7 to 10, the control circuit closes the seventh and eighth switching elements at all times during both the first and second periods.

Configuration 12

In the power conversion device according to any one of Configurations 7 to 11, the fourth period is longer than the seventh period and completely includes the seventh period, and the sixth period is longer than the eighth period and completely includes the eighth period.

Configuration 13

In the power conversion device according to any one of Configurations 1 to 12, each of the first to eighth switching elements is a MOSFET including a body diode.

Configuration 14

In the power conversion device according to any one of Configurations 1 to 12, each of the first to eighth switching elements is a combination of a MOSFET and a diode.

Configuration 15

In the power conversion device according to any one of Configurations 1 to 14, when a voltage drop occurs between the third and fourth terminals in a direction that is the same as a direction in which an electric current flows through one of the commercial power system and the load, the power conversion device operates in a power supply mode in which electric power is supplied from the DC power source to one of the commercial power system and the load.

When a voltage drop occurs between the third and fourth terminals in a direction that is opposite to a direction in which an electric current flows through one of the commercial power system and the load, the power conversion device operates in a power regeneration mode in which electric power is regenerated from one of the commercial power system and the load to the DC power source.

Configuration 16

The power conversion device according to Configuration 15 further includes a chopper circuit disposed between the first and second terminals and the primary side inverter circuit. The chopper circuit performs a step-up operation in the power supply mode and performs a step-down operation in the power regeneration mode.

Configuration 18

The power conversion device according to any one of Configurations 1 to 16 further includes a capacitor connected between the fifth terminal and the sixth terminal.

Configuration 19

A power conversion device includes first and second terminals connected to a DC power source, third and fourth terminals connected to one of a commercial power system and a load, a transformer including a primary winding and a secondary winding, a primary side inverter circuit connected between the first and second terminals and the primary winding, a secondary side converter circuit connected between the secondary winding and third and fourth terminals, and a control circuit that controls the primary side inverter circuit and the secondary side converter circuit.

The secondary winding includes fifth and sixth terminals.

The secondary side converter circuit includes first to eighth switching elements each allowing a current to flow in only one direction when being open and allowing a current to flow bidirectionally when being closed.

The first and fifth switching elements are connected in series between the third and fifth terminals so that directions in which currents flow through the first and fifth switching elements are opposite when being open, the second and sixth switching elements are connected in series between the fourth and fifth terminals so that directions in which currents flow through the second and sixth switching elements are opposite when being open, the third and seventh switching elements are connected in series between the third and sixth terminals so that directions in which currents flow through third and seventh switching elements are opposite when being open, the fourth and eighth switching elements are connected in series between the fourth and sixth terminals so that directions in which currents flow through fourth and eighth switching elements are opposite when being open, the first and second switching elements are disposed so that currents flowing in the first and second switching elements from the third terminal to the fourth terminal via a circuit including the first, second, fifth, and sixth switching elements are the same when being open, the third and fourth switching elements are disposed so that currents flowing in the third and fourth switching elements from the third terminal to the fourth terminal via a circuit including the third, fourth, seventh, and eighth switching elements are the same when being open, and the first and third switching elements are disposed so that currents flowing in the first and third switching elements from the fifth terminal to the sixth terminal via a circuit including the first, third, fifth, and seventh switching elements are opposite when being open.

Within a first period in which a voltage between the fifth and sixth terminals has a first polarity, the control circuit closes the first switching element for a variable time, closes the fifth switching element for at least a period of time during which the first switching element is closed, and increases or decreases the period of time during which the fifth switching element is closed in accordance with an increase or a decrease in the period of time during which the first switching element is closed.

Within a second period in which the voltage between the fifth and sixth terminals has a second polarity that is opposite to the first polarity, the control circuit closes the second switching element for a variable time, closes the sixth switching element for at least a period of time during which the second switching element is closed, and increases or decreases the period of time during which the sixth switching element is closed in accordance with an increase or a decrease in the period of time during which the second switching element is closed.

Configuration 20

In the power conversion device according to Configuration 19, during the first period, the control circuit closes only one of the first and seventh switching elements, and increases or decreases the period of time during which the seventh switching element is open in accordance with an increase or a decrease in the period of time during which the first switching element is closed.

During the second period, the control circuit closes only one of the second and eighth switching elements, and increases or decreases the period of time during which the eighth switching element is open in accordance with an increase or a decrease in the period of time during which the second switching element is closed.

Configuration 21

In the power conversion device according to Configuration 19 or 20, the control circuit closes the third and fourth switching elements at all times during both the first and second periods.

Configuration 22

In the power conversion device according to any one of Configurations 19 to 21, the control circuit closes at least one of the fifth and seventh switching elements and closes at least one of the sixth and eighth switching elements during both the first and second periods.

Configuration 23

In the power conversion device according to Configuration 19, during the first period, the control circuit closes the sixth switching element instead of closing the first switching element for a variable time, closes the second switching element for at least a period of time during which the sixth switching element is closed, and increases or decreases the period of time during which the second switching element is closed in accordance with an increase or a decrease in the period of time during which the sixth switching element is closed.

During the second period, the control circuit closes the fifth switching element instead of closing the second switching element for a variable time, closes the first switching element for at least a period of time during which the fifth switching element is closed, and increases or decreases the period of time during which the first switching element is closed in accordance with an increase or a decrease in the period of time during which the fifth switching element is closed.

Configuration 24

In the power conversion device according to Configuration 23, during the first period, the control circuit closes only one of the fourth and sixth switching elements, and increases or decreases the period of time during which the fourth switching element is open in accordance with an increase or a decrease in the period of time during which the sixth switching element is closed.

During the second period, the control circuit closes only one of the third and fifth switching elements, and increases or decreases the period of time during which the third switching element is open in accordance with an increase or a decrease in the period of time during which the fifth switching element is closed.

Configuration 25

In the power conversion device according to Configuration 23 or 24, the control circuit closes the seventh and eighth switching elements at all times during both the first and second periods.

Configuration 26

In the power conversion device according to any one of Configurations 23 to 25, the control circuit closes at least one of the second and fourth switching elements and closes at least one of the first and third switching elements during both the first and second periods.

Configuration 27

A power conversion device includes
first and second terminals connected to a DC power source,
third and fourth terminals connected to one of a commercial power system and a load,
a transformer including a primary winding and a secondary winding,
a primary side inverter circuit connected between the first and second terminals and the primary winding,
a secondary side converter circuit connected between the secondary winding and third and fourth terminals, and
a control circuit that controls the primary side inverter circuit and the secondary side converter circuit.

The secondary winding includes fifth and sixth terminals.

The secondary side converter circuit includes first to eighth switching elements each allowing a current to flow in only one direction when being open and allowing a current to flow bidirectionally when being closed.

The first and fifth switching elements are connected in series between the third and fifth terminals so that directions in which currents flow through the first and fifth switching elements are opposite when being open,
the second and sixth switching elements are connected in series between the fourth and fifth terminals so that directions in which currents flow through the second and sixth switching elements are opposite when being open,
the third and seventh switching elements are connected in series between the third and sixth terminals so that directions in which currents flow through third and seventh switching elements are opposite when being open,
the fourth and eighth switching elements are connected in series between the fourth and sixth terminals so that directions in which currents flow through fourth and eighth switching elements are opposite when being open,
the first and second switching elements are disposed so that currents flowing in the first and second switching elements from the third terminal to the fourth terminal via a circuit including the first, second, fifth, and sixth switching elements are the same when being open,
the third and fourth switching elements are disposed so that currents flowing in the third and fourth switching elements from the third terminal to the fourth terminal via a circuit including the third, fourth, seventh, and eighth switching elements are the same when being open, and
the first and third switching elements are disposed so that currents flowing in the first and third switching elements from the fifth terminal to the sixth terminal via a circuit including the first, third, fifth, and seventh switching elements are opposite when being open.

Within a first period in which a voltage between the first and second terminals has a first polarity, the control circuit opens the fourth switching element for a variable time, closes only one of the fourth and sixth switching elements, and increases or decreases the period of time during which the sixth switching element is closed in accordance with an increase or a decrease in the period of time during which the fourth switching element is open.

Within a second period in which the voltage between the first and second terminals has a second polarity that is opposite to the first polarity, the control circuit opens the third switching element for a variable time, closes only one of the third and fifth switching elements, and increases or decreases the period of time during which the fifth switching element is closed in accordance with an increase or a decrease in the period of time during which the third switching element is open.

Configuration 28

In the power conversion device according to Configuration 27, during the first period, the control circuit closes the second switching element for at least a period of time during which the fourth switching element is open, and increases or decreases the period of time during which the second switching element is closed in accordance with an increase or a decrease in the period of time during which the fourth switching element is open.

During the second period, the control circuit closes the first switching element for at least a period of time during which the third switching element is open, and increases or decreases the period of time during which the first switching element is closed in accordance with an increase or a decrease in the period of time during which the third switching element is open.

Configuration 29

In the power conversion device according to Configuration 27 or 28, the control circuit closes the seventh and eighth switching elements at all times during both the first and second periods.

Configuration 30

In the power conversion device according to any one of Configurations 27 to 29, the control circuit closes at least one of the sixth and eighth switching elements and closes at least one of the fifth and seventh switching elements during both the first and second periods.

Configuration 31

In the power conversion device according to Configuration 27, during the first period, the control circuit opens the seventh switching element instead of opening the fourth switching element for a variable time, closes only one of the first and seventh switching elements, and increases or decreases the period of time during which the first switching element is closed in accordance with an increase or a decrease in the period of time during which the seventh switching element is open.

During the second period, the control circuit opens the eighth switching element instead of opening the third switching element for a variable time, closes only one of the second and eighth switching elements, and increases or decreases the period of time during which the second switching element is closed in accordance with an increase or a decrease in the period of time during which the eighth switching element is open.

Configuration 32

In the power conversion device according to Configuration 31, during the first period, the control circuit closes the fifth switching element for at least a period of time during which the seventh switching element is open, and increases or decreases the period of time during which the fifth switching element is closed in accordance with an increase or a decrease in the period of time during which the seventh switching element is open.

During the second period, the control circuit closes the sixth switching element for at least a period of time during which the eighth switching element is open, and increases or decreases the period of time during which the sixth switching element is closed in accordance with an increase or a decrease in the period of time during which the eighth switching element is open.

Configuration 33

In the power conversion device according to Configuration 31 or 32, the control circuit closes the third and fourth switching elements at all times during both the first and second periods.

Configuration 34

In the power conversion device according to any one of Configurations 31 to 33, the control circuit closes at least one of the first and third switching elements and closes at least one of the second and fourth switching elements during both the first and second periods.

Configuration 35

In the power conversion device according to any one of Configurations 19 to 34, each of the first to eighth switching elements is a MOSFET including a body diode.

Configuration 36

In the power conversion device according to any one of Configurations 19 to 34, each of the first to eighth switching elements is a combination of a MOSFET and a diode.

Configuration 37

In the power conversion device according to any one of Configurations 19 to 36, when a voltage drop occurs between the third and fourth terminals in a direction that is the same as a direction in which an electric current flows through one of the commercial power system and the load, the power conversion device operates in a power supply mode in which electric power is supplied from the DC power source to one of the commercial power system and the load.

When a voltage drop occurs between the third and fourth terminals in a direction that is opposite to a direction in which an electric current flows through one of the commercial power system and the load, the power conversion device operates in a power regeneration mode in which electric power is regenerated from one of the commercial power system and the load to the DC power source.

Configuration 38

The power conversion device according to Configuration 37 further includes a chopper circuit connected to the primary side inverter circuit. The chopper circuit performs a step-up operation in the power supply mode and performs a step-down operation in the power regeneration mode.

Configuration 39

The power conversion device according to any one of Configurations 19 to 38 further includes a capacitor connected between the fifth terminal and the sixth terminal.

The present disclosure is applicable to, for example, a power conditioner for a stationary storage battery or a V2H (Vehicle to Home) power conditioner for electric vehicles (EVs)/plug-in hybrid vehicles (PHVs).

What is claimed is:
1. A power conversion device comprising:
   first and second terminals connected to a DC power source;
   third and fourth terminals connected to a commercial power system or a load;
   a transformer including a primary winding and a secondary winding that has fifth and sixth terminals;
   an inverter circuit connected between the first and second terminals and the primary winding;

a converter circuit that includes
a first switch circuit including a first switch and a first diode connected in parallel with the first switch, the first switch circuit being connected between the third and fifth terminals,
a second switch circuit including a second switch and a second diode connected in parallel with the second switch, the second switch circuit being connected between the fourth and fifth terminals,
a third switch circuit including a third switch and a third diode connected in parallel with the third switch, the third switch circuit being connected between the third and sixth terminals,
a fourth switch circuit including a fourth switch and a fourth diode connected in parallel with the fourth switch, the fourth switch circuit being connected between the fourth and sixth terminals,
a fifth switch circuit including a fifth switch and a fifth diode connected in parallel with the fifth switch, the fifth switch circuit being connected to the first switch circuit in series between the third and fifth terminals, the fifth diode being reversely connected to the first diode,
a sixth switch circuit including a sixth switch and a sixth diode connected in parallel with the sixth switch, the sixth switch circuit being connected to the second switch circuit in series between the fourth and fifth terminals, the sixth diode being reversely connected to the second diode,
a seventh switch circuit including a seventh switch and a seventh diode connected in parallel with the seventh switch, the seventh switch circuit being connected to the third switch circuit in series between the third and sixth terminals, the seventh diode being reversely connected to the third diode, and
an eighth switch circuit including an eighth switch and an eighth diode connected in parallel with the eighth switch, the eighth switch circuit being connected to the fourth switch circuit in series between the fourth and sixth terminals, the eighth diode being reversely connected to the fourth diode; and
a control circuit that
when a voltage between the fifth and sixth terminals has a first polarity, controls the first switch to be in ON state during a first ON period and controls the fifth switch to be in ON state during a second ON period longer than the first ON period, the second ON period completely including the first ON period, and
when the voltage between the fifth and sixth terminals has a second polarity opposite to the first polarity, controls the second switch to be in ON state during a third ON period and controls the sixth switch to be in ON state during a fourth ON period longer than the third ON period, the fourth ON period completely including the third ON period.

2. The power conversion device according to claim 1, wherein
the control circuit further
lengthens the second ON period when lengthening the first ON period,
shortens the second ON period when shortening the first ON period,
lengthens the fourth ON period when lengthening the third ON period, and
shortens the fourth ON period when shortening the third ON period.

3. The power conversion device according to claim 1, wherein
the control circuit further
when the voltage between the fifth and sixth terminals has the first polarity, controls the seventh switch to be in OFF state during a first OFF period longer than the first ON period, the first OFF period completely including the first ON period, and
when the voltage between the fifth and sixth terminals has the second polarity, controls the eighth switch to be in OFF state during a second OFF period longer than the third ON period, the second OFF period completely including the third ON period.

4. The power conversion device according to claim 3, wherein
the control circuit further
lengthens the first OFF period when lengthening the first ON period,
shortens the first OFF period when shortening the first ON period,
lengthens the second OFF period when lengthening the third ON period, and
shortens the second OFF period when shortening the third ON period.

5. The power conversion device according to claim 1, wherein
the control circuit further
in either case when the voltage between the fifth and sixth terminals has the first or second polarity, controls the third and fourth switches to maintain in ON state.

6. The power conversion device according to claim 3, wherein
the second ON period is longer than the first OFF period, and completely includes the first OFF period, and
the fourth ON period is longer than the second OFF period, and completely includes the second OFF period.

7. The power conversion device according to claim 1, wherein each of the first to eighth switch circuits is a MOSFET including a body diode.

8. The power conversion device according to claim 1, wherein each of the first to eighth switch circuits is a combination of a MOSFET and an external diode.

9. The power conversion device according to claim 1, wherein
when a voltage drop occurs between the third and fourth terminals in a direction that is the same as a direction in which an electric current flows between the third and fourth terminals through the commercial power system or the load, the power conversion device operates in a power supply mode in which electric power is supplied from the DC power source to the commercial power system or the load, and
wherein when a voltage drop occurs between the third and fourth terminals in a direction that is opposite to a direction in which an electric current flows between the third and fourth terminals through the commercial power system or the load, the power conversion device operates in a power regeneration mode in which electric power is regenerated from the commercial power system or the load to the DC power source.

10. The power conversion device according to claim 9, further comprising:
a chopper circuit disposed between the first and second terminals and the inverter circuit, wherein the chopper circuit performs a step-up operation in the power supply mode and performs a step-down operation in the power regeneration mode.

11. The power conversion device according to claim 1, further comprising:
a capacitor connected between the fifth terminal and the sixth terminal.

\* \* \* \* \*